United States Patent
Araki et al.

(10) Patent No.: US 10,748,559 B1
(45) Date of Patent: Aug. 18, 2020

(54) MAGNETIC HEAD INCLUDING SPIN TORQUE OSCILLATOR AND MANUFACTURING METHOD FOR THE SAME

(71) Applicants: Hironori Araki, Milpitas, CA (US); Yoshitaka Sasaki, Los Gatos, CA (US); Hiroyuki Ito, Milpitas, CA (US); Yoji Nomura, Milpitas, CA (US); Shigeki Tanemura, Milpitas, CA (US); Kazuki Sato, Milpitas, CA (US); Tetsuya Roppongi, Milpitas, CA (US); Atsushi Yamaguchi, Milpitas, CA (US)

(72) Inventors: Hironori Araki, Milpitas, CA (US); Yoshitaka Sasaki, Los Gatos, CA (US); Hiroyuki Ito, Milpitas, CA (US); Yoji Nomura, Milpitas, CA (US); Shigeki Tanemura, Milpitas, CA (US); Kazuki Sato, Milpitas, CA (US); Tetsuya Roppongi, Milpitas, CA (US); Atsushi Yamaguchi, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 16/801,399

(22) Filed: Feb. 26, 2020

(51) Int. Cl.
| | |
|---|---|
| *G11B 5/127* | (2006.01) |
| *G11B 5/31* | (2006.01) |
| *G11B 5/02* | (2006.01) |
| *G11B 5/235* | (2006.01) |

(52) U.S. Cl.
CPC ............ *G11B 5/1278* (2013.01); *G11B 5/02* (2013.01); *G11B 5/235* (2013.01); *G11B 5/314* (2013.01); *G11B 5/315* (2013.01); *G11B 5/3116* (2013.01); *G11B 5/3163* (2013.01)

(58) Field of Classification Search
CPC .......... G11B 5/1278; G11B 5/02; G11B 5/235
USPC .................. 360/125.1–125.5, 125.31–125.35
See application file for complete search history.

(56) References Cited

U.S. PATENT DOCUMENTS

| | | | |
|---|---|---|---|
| 8,320,079 B2 | 11/2012 | Iwasaki et al. | |
| 8,917,481 B2 | 12/2014 | Kusukawa et al. | |
| 10,032,470 B1 | 7/2018 | Degawa et al. | |
| 10,109,302 B1 | 10/2018 | Shinohara et al. | |
| 10,121,497 B1 * | 11/2018 | Takahashi | G11B 5/1278 |
| 2017/0148474 A1 * | 5/2017 | Okamura | G11B 5/235 |
| 2018/0075868 A1 | 3/2018 | Koui et al. | |
| 2019/0279666 A1 * | 9/2019 | Freitag | G11B 5/3909 |

\* cited by examiner

*Primary Examiner* — Allen T Cao
(74) *Attorney, Agent, or Firm* — Oliff PLC

(57) ABSTRACT

A magnetic head includes a main pole, a trailing shield, a spin torque oscillator, and a buffer layer. The buffer layer is interposed between the main pole and the spin torque oscillator. The spin torque oscillator has first and second side surfaces. The first and second side surfaces respectively form first and second angles with respect to a direction perpendicular to a top surface of a substrate. The first and second angles each fall within a range of 0° to 10°. The buffer layer has third and fourth side surfaces. The third side surface includes a first inclined portion forming a third angle greater than the first angle. The fourth side surface includes a second inclined portion forming a fourth angle greater than the second angle.

9 Claims, 25 Drawing Sheets

MAGNETIC HEAD INCLUDING SPIN TORQUE OSCILLATOR AND MANUFACTURING METHOD FOR THE SAME

BACKGROUND OF THE INVENTION

1. Field of the Invention

The present invention relates to a magnetic head including a spin torque oscillator, and a manufacturing method for the same.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a magnetic path forming section. The coil generates a magnetic field corresponding to data to be written on the recording medium. The magnetic path forming section is made of a magnetic material and forms a magnetic path for passing a magnetic flux corresponding to the magnetic field generated by the coil.

The magnetic path forming section includes, for example, a main pole, a trailing shield, and a return path section. The main pole has a first end face located in a medium facing surface configured to face a recording medium. The trailing shield has a second end face located in the medium facing surface at a position forward relative to the first end face in a direction of travel of the recording medium. The return path section magnetically connects part of the main pole away from the medium facing surface to the trailing shield. The main pole generates from the first end face a write magnetic field for writing data on the recording medium.

Recently, the use of what is called a spin torque oscillator in a magnetic head has been proposed as a method for increasing the recording density of a magnetic disk drive. U.S. Pat. Nos. 8,320,079 B2, 8,917,481 B2, 10,032,470 B1, and 10,109,302 B1 each disclose a technology of using a spin torque oscillator that generates a microwave magnetic field. According to the technology, a microwave magnetic field is generated by the spin torque oscillator, and the microwave magnetic field and the write magnetic field are simultaneously applied to a portion of the recording medium on which data is to be written. To increase the recording density, it is effective to increase the coercivity of the recording medium by making magnetic fine particles of the recording medium smaller and, at the same time, enhancing the anisotropic energy of the magnetic fine particles. The aforementioned technology enables data writing with the coercivity of the recording medium lowered by microwaves, thus enabling use of a recording medium having high coercivity.

U.S. Patent Application Publication No. 2018/0075868 A1 discloses a technology of using a spin torque oscillator that adjusts permeability. The spin torque oscillator blocks magnetic flux leaking from the main pole to the trailing shield. The technology makes it possible to make a gap between the main pole and the shield smaller. This in turn makes it possible to steepen the gradient of change in the strength of the write magnetic field to thereby increase the recording density.

In both of the above-described two technologies, the spin torque oscillator is disposed between the main pole and the trailing shield and electrically connected to the main pole and the trailing shield. A current for operating the spin torque oscillator is supplied via the main pole and the trailing shield. Hereinafter, a surface of the spin torque oscillator to be in contact with the main pole will be referred to as a bottom surface of the spin torque oscillator, and a surface of the spin torque oscillator to be in contact with the trailing shield will be referred to as a top surface of the spin torque oscillator. Similarly, a surface of the main pole to be in contact with the spin torque oscillator will be referred to as a top surface of the main pole, and a surface of the trailing shield to be in contact with the spin torque oscillator will be referred to as a bottom surface of the trailing shield.

A method of forming a spin torque oscillator will now be discussed. Typically, a spin torque oscillator is formed as follows. A layered film to later become the spin torque oscillator is initially formed on the top surface of the main pole, and then the layered film is patterned by etching so that a plurality of surfaces of the spin torque oscillator other than the top and bottom surfaces are formed in the layered film. Here, a width in the track width direction will be simply referred to as a width. Conventionally, the top surface of the spin torque oscillator is formed to have a width smaller than that of the bottom surface of the spin torque oscillator. This results in a smaller contact area between the spin torque oscillator and the trailing shield than a contact area between the spin torque oscillator and the main pole.

Typically, for a magnetic head using a spin torque oscillator, it is possible to increase the recording density by increasing a voltage applied to the spin torque oscillator. However, if a high voltage is applied to the spin torque oscillator with the contact area between the spin torque oscillator and the trailing shield being small as described above, there arises a problem that the spin torque oscillator generates heat and as a result, the lifetime of the magnetic head gets shorter.

The spin torque oscillator is typically formed on a portion of the top surface of the main pole near the medium facing surface. The width of the spin torque oscillator is almost equal to the width of the portion of the top surface of the main pole near the medium facing surface. If the portion of the top surface of the main pole near the medium facing surface is reduced in width in order to reduce the track width, the width of the spin torque oscillator also decreases. In such a case, the above-described problem becomes significant.

SUMMARY OF THE INVENTION

It is an object of the present invention to provide a magnetic head including a spin torque oscillator and a manufacturing method for the same that make it possible to prevent a contact area between the spin torque oscillator and a trailing shield from being small.

A magnetic head of the present invention includes: a medium facing surface configured to face a recording medium; a main pole configured to generate a write magnetic field for writing data on the recording medium; a trailing shield formed of a magnetic material and located forward relative to the main pole in the direction of travel of the recording medium; a spin torque oscillator disposed between the main pole and the trailing shield and electrically connected to the main pole and the trailing shield; a buffer layer formed of a nonmagnetic conductive material and interposed between the main pole and the spin torque oscillator; and a substrate having a top surface. The main pole, the trailing shield, the spin torque oscillator, and the buffer layer are disposed above the top surface of the substrate.

The spin torque oscillator has a first side surface and a second side surface opposite to each other in a track width direction. The first side surface and the second side surface respectively form a first angle and a second angle with respect to a direction perpendicular to the top surface of the substrate. The first angle and the second angle each fall within a range of 0° to 10°.

The buffer layer has a third side surface and a fourth side surface opposite to each other in the track width direction. The third side surface is contiguous with the first side surface. The third side surface includes a first inclined portion inclined with respect to the direction perpendicular to the top surface of the substrate. The first inclined portion forms a third angle greater than the first angle with respect to the direction perpendicular to the top surface of the substrate.

The fourth side surface is contiguous with the second side surface. The fourth side surface includes a second inclined portion inclined with respect to the direction perpendicular to the top surface of the substrate. The second inclined portion forms a fourth angle greater than the second angle with respect to the direction perpendicular to the top surface of the substrate.

In the magnetic head of the present invention, the third side surface may further include a first connecting portion connecting the first side surface and the first inclined portion. The first connecting portion may form an angle equal to the first angle with respect to the direction perpendicular to the top surface of the substrate. The fourth side surface may further include a second connecting portion connecting the second side surface and the second inclined portion. The second connecting portion may form an angle equal to the second angle with respect to the direction perpendicular to the top surface of the substrate.

The magnetic head of the present invention may further include: first and second side shields formed of a magnetic material and located on opposite sides of the main pole in the track width direction; and a gap layer formed of a nonmagnetic material and interposed between the main pole and the first and second side shields. In such a case, each of the third and fourth side surfaces may have a bottom edge closest to the top surface of the substrate. The bottom edge of each of the third and fourth side surfaces may be in contact with the gap layer.

In the magnetic head of the present invention, each of the third and fourth side surfaces may have a bottom edge closest to the top surface of the substrate. The bottom edge of each of the third and fourth side surfaces may be in contact with the main pole.

A manufacturing method for the magnetic head of the present invention includes: a step of forming the main pole; a step of forming the spin torque oscillator and the buffer layer after the main pole is formed; and a step of forming the trailing shield after the spin torque oscillator and the buffer layer are formed.

The step of forming the spin torque oscillator and the buffer layer includes: a step of forming an initial buffer layer on the main pole, the initial buffer layer becoming the buffer layer later; a step of forming a layered film on the initial buffer layer, the layered film becoming the spin torque oscillator later; a step of forming a protective layer on the layered film; a step of forming a mask; a first etching step of etching a portion of the protective layer by using the mask; a second etching step of etching a portion of each of the layered film and the initial buffer layer by using the mask and the protective layer as an etching mask after the first etching step so that the initial buffer layer becomes the buffer layer; and a patterning step of patterning the layered film after the second etching step so that the layered film becomes the spin torque oscillator.

In the manufacturing method for the magnetic head of the present invention, the spin torque oscillator may further have a rear end face farthest from the medium facing surface. In such a case, the mask may have a first sidewall that defines the shape and the position of each of the first and third side surfaces, and a second sidewall that defines the shape and the position of each of the second and fourth side surfaces. The second etching step may be a step of etching the layered film and the initial buffer layer so as to provide the layered film with the first and second side surfaces and provide the initial buffer layer with the third and fourth side surfaces. The patterning step may be a step of etching the layered film so as to provide the layered film with the rear end face.

In the manufacturing method for the magnetic head of the present invention, the protective layer may be formed of carbon.

In the manufacturing method for the magnetic head of the present invention, the mask may be formed of a photoresist. In such a case, the mask may be located at a distance from the protective layer in a cross section taken at a position where the medium facing surface is to be formed.

In the present invention, the first side surface and the second side surface of the spin torque oscillator respectively form the first angle and the second angle with respect to the direction perpendicular to the top surface of the substrate. The first and second angles each fall within the range of 0° to 10°. According to the present invention, this makes it possible to prevent the contact area between the spin torque oscillator and the trailing shield from being small.

Other objects, features and advantages of the present invention will become fully apparent from the following description.

DETAILED DESCRIPTION OF THE PREFERRED EMBODIMENTS

First Embodiment

Figure 5:
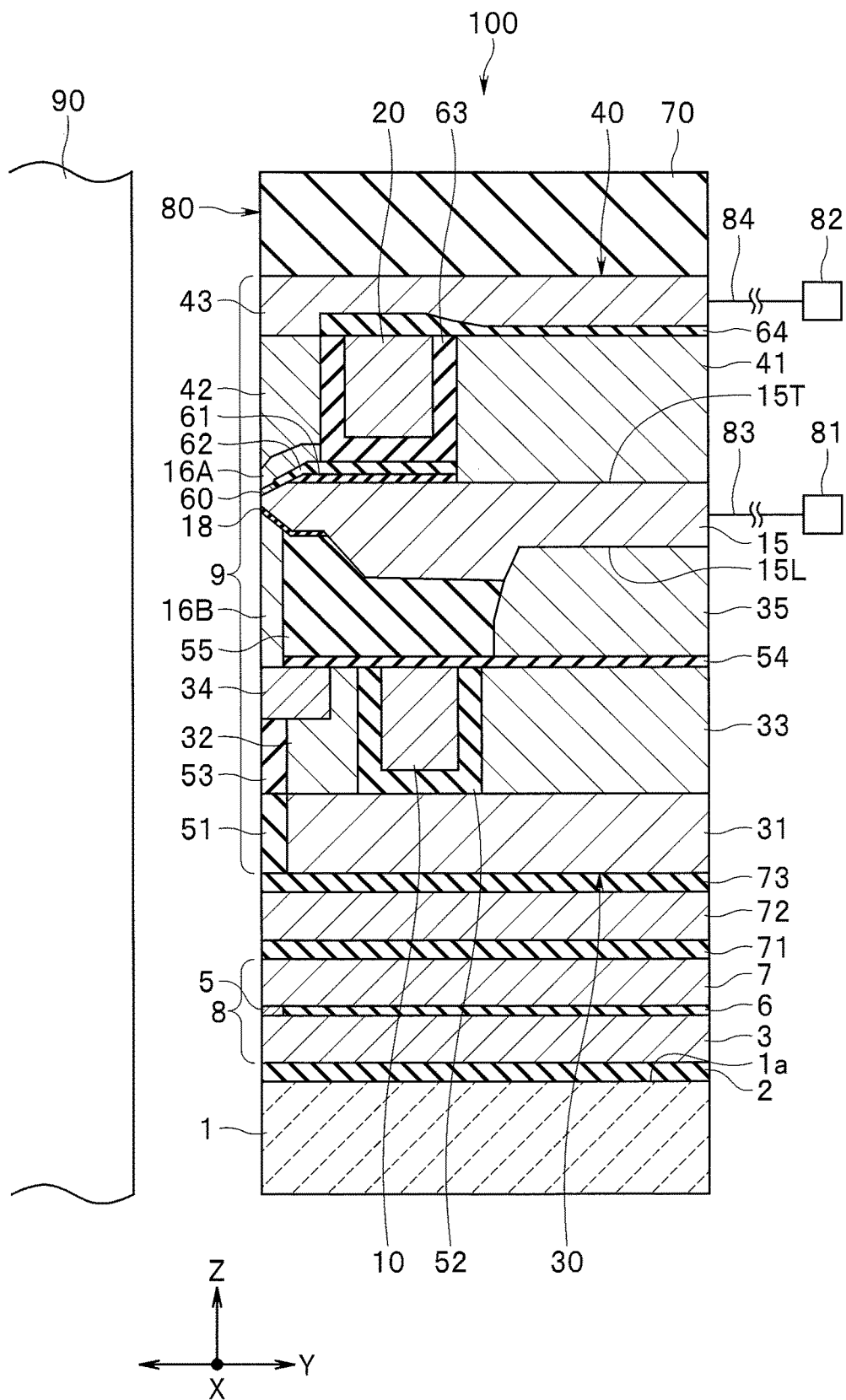
FIG. 5 is a cross-sectional view illustrating a configuration of the magnetic head according to the first embodiment of the invention.
Figure 6:
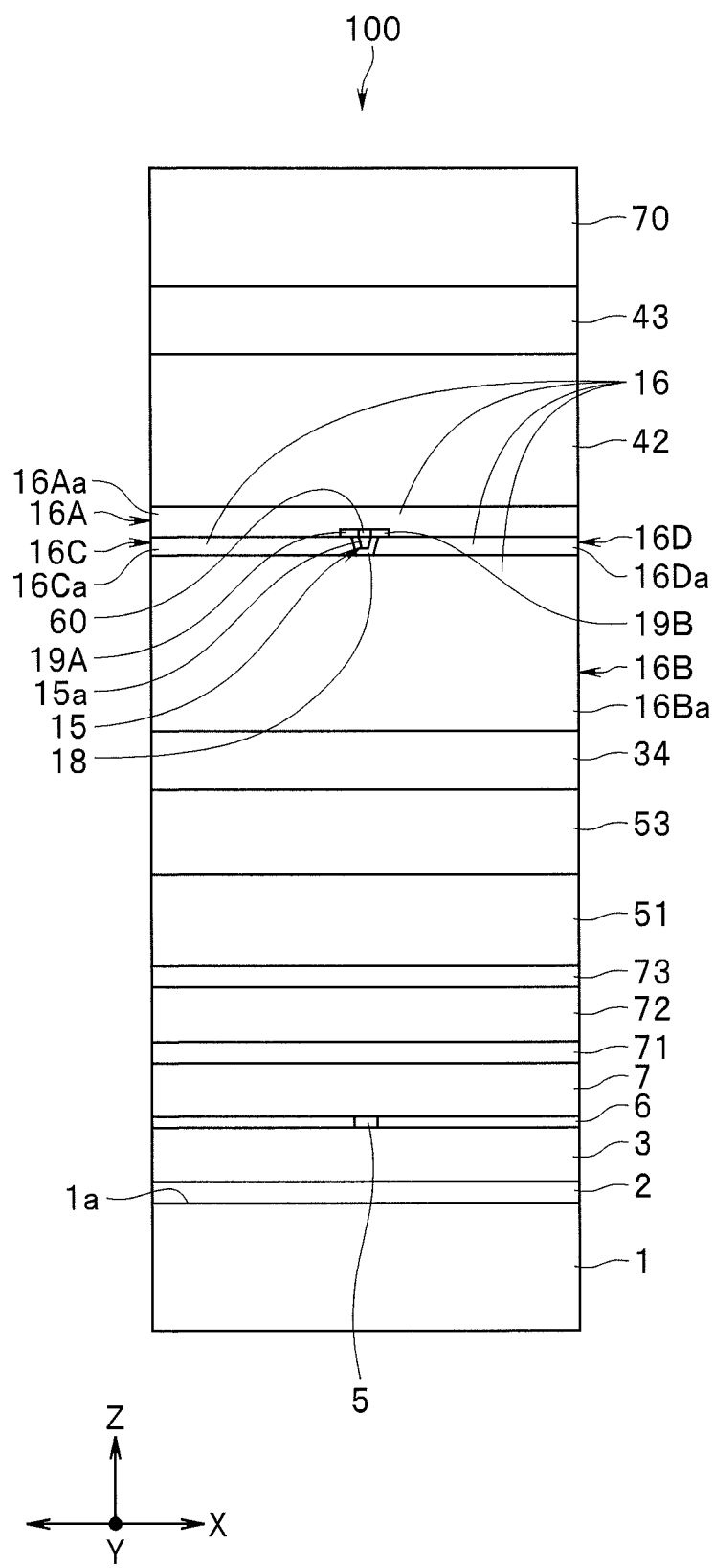
FIG. 6 is a front view illustrating a medium facing surface of the magnetic head according to the first embodiment of the invention.
Figure 7:
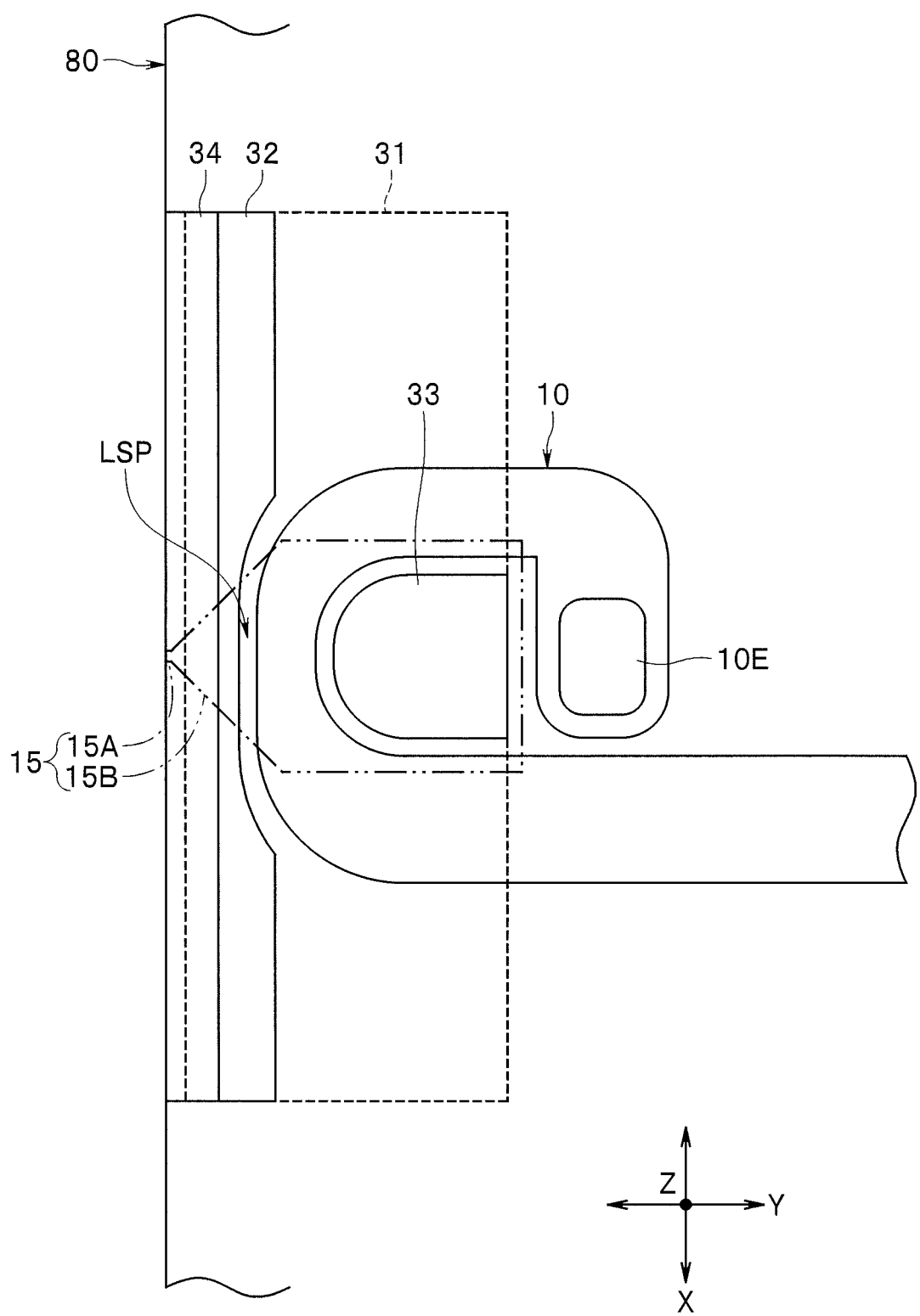
FIG. 7 is a plan view illustrating a lower coil portion of the magnetic head according to the first embodiment of the invention.
Figure 8:
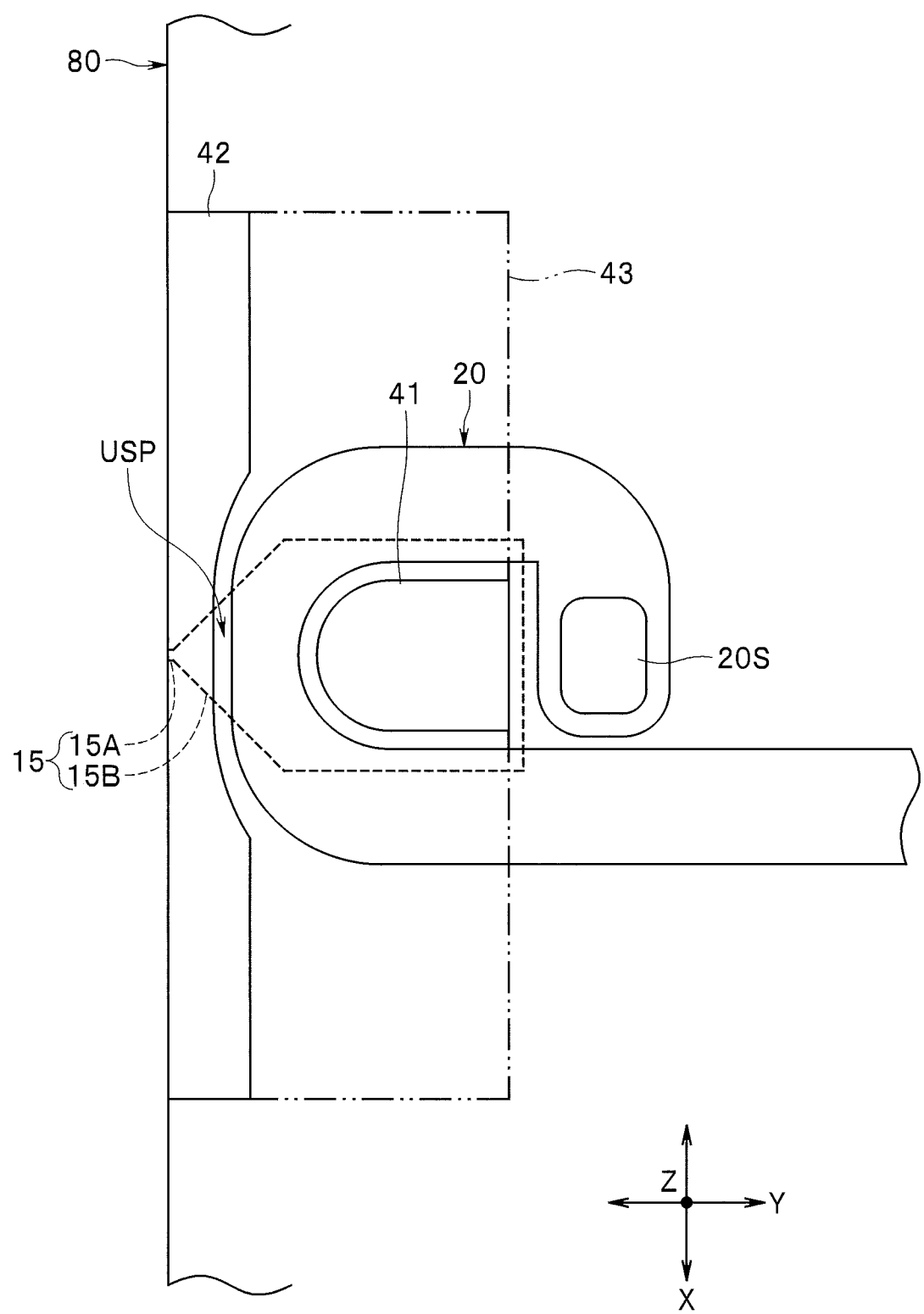
FIG. 8 is a plan view illustrating an upper coil portion of the magnetic head according to the first embodiment of the invention.

Preferred embodiments of the present invention will now be described in detail with reference to the drawings. First, reference is made to FIG. 5 to FIG. 8 to describe a configuration of a magnetic head according to a first embodiment of the invention. FIG. 5 is a cross-sectional view illustrating a configuration of the magnetic head. FIG. 6 is a front view illustrating the medium facing surface of the magnetic head. FIG. 7 is a plan view illustrating a lower coil portion of the magnetic head. FIG. 8 is a plan view illustrating an upper coil portion of the magnetic head.

The magnetic head 100 according to the present embodiment is one intended for perpendicular magnetic recording. The magnetic head 100 according to the present embodiment is for use with, e.g., a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As illustrated in FIG. 5, the magnetic head 100 has the aforementioned medium facing surface 80. Further, as illustrated in FIG. 5 and FIG. 6, the magnetic head 100 includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head 100 further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has a function of shielding the MR element 5 from magnetic fields generated in the write head unit 9. The nonmagnetic layers 71 and 73 are formed of alumina, for example.

The write head unit 9 includes a coil, a main pole 15, and a write shield 16. The coil generates a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel. The main pole 15 has an end face 15a located in the medium facing surface 80, and is configured to pass a magnetic flux corresponding to the magnetic field generated by the coil and to generate a write magnetic field for writing data on the recording medium 90 by means of a perpendicular magnetic recording system. FIG. 5 illustrates a cross section that intersects the end face 15a of the main pole 15 and that is perpendicular to the medium facing surface 80 and to the top surface 1a of the substrate 1.

As illustrated in FIG. 6, the write shield 16 includes a trailing shield 16A, a leading shield 16B, a first side shield 16C, and a second side shield 16D. The trailing shield 16A is located forward relative to the main pole 15 in the direction of travel of the recording medium 90 (the Z direction). Being located forward relative to the main pole 15 in the direction of travel of the recording medium 90 refers to being located farther from the top surface 1a of the substrate 1 than the main pole 15. The leading shield 16B is located backward relative to the main pole 15 in the direction of travel of the recording medium 90. Being located backward relative to the main pole 15 in the direction of travel of the recording medium 90 refers to being located closer to the top surface 1a of the substrate 1 than the main pole 15. The first and second side shields 16C and 16D are located farther from the top surface 1a of the substrate 1 than the leading shield 16B, opposed to each other in the track width direction (the X direction) with the main pole 15 therebetween, and magnetically couple the trailing shield 16A and the leading shield 16B.

As illustrated in FIG. 6, the trailing shield 16A has a front end face 16Aa located in the medium facing surface 80. The leading shield 16B has a front end face 16Ba located in the medium facing surface 80. The first side shield 16C has a front end face 16Ca located in the medium facing surface 80. The second side shield 16D has a front end face 16Da located in the medium facing surface 80.

The front end face 16Aa is located forward relative to the end face 15a of the main pole 15 in the direction of travel of the recording medium 90. The front end face 16Ba is located backward relative to the end face 15a of the main pole 15 in the direction of travel of the recording medium 90. The front end faces 16Ca and 16Da are located on opposite sides of the end face 15a of the main pole 15 in the track width direction. In the medium facing surface 80, the front end faces 16Aa, 16Ba, 16Ca, and 16Da are arranged to surround the end face 15a of the main pole 15.

The write shield 16 is formed of a magnetic material. For example, CoFeN, CoNiFe, FeNi, or CoFe may be used as the material of the write shield 16.

The write head unit 9 further includes a spin torque oscillator 60. The spin torque oscillator 60 is located between the main pole 15 and the trailing shield 16A in the vicinity of the medium facing surface 80 and electrically connected to the main pole 15 and the trailing shield 16A. The spin torque oscillator 60 may be an element configured to generate a microwave magnetic field or an element configured to adjust a permeability between the main pole 15 and the trailing shield 16A. The configuration of the spin torque oscillator 60 will be described in detail later.

The write head unit 9 further includes a buffer layer 59 formed of a nonmagnetic conductive material. Note that the buffer layer 59 is illustrated in FIG. 1 to FIG. 4 to be described later. The buffer layer 59 is interposed between the main pole 15 and the spin torque oscillator 60. The buffer layer 59 is formed of, for example, one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

The write head unit 9 further includes an upper return path section 40 and a lower return path section 30. Both the upper return path section 40 and the lower return path section 30 are formed of a magnetic material. For example, CoFeN, CoNiFe, FeNi, or CoFe may be used as the material of the upper return path section 40 and the lower return path section 30.

The upper return path section 40 is located forward relative to the main pole 15 in the direction of travel of the recording medium 90, and connects part of the main pole 15 located away from the medium facing surface 80 to the write shield 16, thereby magnetically coupling the main pole 15 to the write shield 16. The upper return path section 40 and the main pole 15 define an upper space USP (see FIG. 8) for a portion of the coil to pass through.

The lower return path section 30 is located backward relative to the main pole 15 in the direction of travel of the recording medium 90, and connects part of the main pole 15 located away from the medium facing surface 80 to the write shield 16, thereby magnetically coupling the main pole 15 to the write shield 16. The lower return path section 30 and the main pole 15 define a lower space LSP (see FIG. 7) for a portion of the coil to pass through.

The lower return path section 30 includes coupling portions 31, 32, 33, 34, and 35. The coupling portion 31 is disposed on the nonmagnetic layer 73. The coupling portions 32 and 33 are both disposed on the coupling portion 31. The coupling portion 32 is located near the medium facing surface 80. The coupling portion 33 is located farther from the medium facing surface 80 than the coupling portion 32.

The coupling portions 31 and 32 have their respective end faces that face toward the medium facing surface 80 and that are each located at a distance from the medium facing surface 80.

As illustrated in FIG. 7, the lower coil portion 10 is wound around the coupling portion 33. The write head unit 9 further includes: an insulating layer 51 formed of an insulating material, disposed on the nonmagnetic layer 73 and surrounding the coupling portion 31; an insulating film 52 formed of an insulating material and isolating the lower coil portion 10 from the coupling portions 31 to 33; and an insulating layer 53 formed of an insulating material and disposed around the lower coil portion 10 and the coupling portion 32. The coupling portion 34 is embedded in the coupling portion 32 and the insulating layer 53. The coupling portion 34 has an end face located in the medium facing surface 80. The top surfaces of the lower coil portion 10, the coupling portions 32 to 34, the insulating film 52 and the insulating layer 53 are even with each other. The insulating layers 51 and 53 and the insulating film 52 are formed of alumina, for example.

The leading shield 16B lies on a part of the top surface of the coupling portion 34. The write head unit 9 further includes an insulating layer 54 formed of an insulating material. The insulating layer 54 lies on another part of the top surface of the coupling portion 34 and on the top surfaces of the lower coil portion 10, the coupling portions 32 and 33, the insulating film 52 and the insulating layer 53. The coupling portion 35 lies over the coupling portion 33 with the insulating layer 53 interposed therebetween. Note that the coupling portions 33 and 35 magnetically couple to each other even with the insulating layer 53 interposed between the coupling portions 33 and 35. The insulating layer 54 is formed of alumina, for example.

The write head unit 9 further includes a nonmagnetic layer 55 formed of a nonmagnetic material. The nonmagnetic layer 55 lies on the insulating layer 54 and surrounds the leading shield 16B and the coupling portion 35. The nonmagnetic layer 55 is formed of alumina or silicon oxide ($SiO_2$), for example.

The first and second side shields 16C and 16D are disposed on the leading shield 16B. The main pole 15 has the end face 15a, and also a top surface 15T (see FIG. 5) farthest from the top surface 1a of the substrate 1, a bottom end 15L (see FIG. 5) opposite to the top surface 15T, and a first side surface and a second side surface (see FIG. 6 to FIG. 8) opposite to each other in the track width direction (the X direction). As illustrated in FIG. 6, the first side shield 16C has a first sidewall opposed to a portion of the first side surface of the main pole 15 located near the medium facing surface 80. The second side shield 16D has a second sidewall opposed to a portion of the second side surface of the main pole 15 located near the medium facing surface 80.

The write head unit 9 further includes a first gap layer 18 formed of a nonmagnetic material. The first gap layer 18 is disposed to extend along the first and second sidewalls of the first and second side shields 16C and 16D, the top surface of the leading shield 16B, and the top surface of the nonmagnetic layer 55. An example of the nonmagnetic material used to form the first gap layer 18 is an insulating material such as alumina.

As illustrated in FIG. 5, the first gap layer 18 is interposed between a portion of the bottom end 15L of the main pole 15 and the top surfaces of the leading shield 16B and the nonmagnetic layer 55. As illustrated in FIG. 6, the first gap layer 18 is interposed also between the first side surface of the main pole 15 and the first sidewall of the first side shield 16C, and between the second side surface of the main pole 15 and the second sidewall of the second side shield 16D.

At a location apart from the medium facing surface 80, the bottom end 15L of the main pole 15 is in contact with the top surface of the coupling portion 35. The main pole 15 is formed of a ferromagnetic material containing one or more elements selected from Ni, Fe, and Co, such as FeNi, CoNiFe, or CoFe. The shape of the main pole 15 will be described in detail later.

The write head unit 9 further includes a first nonmagnetic layer (not illustrated) formed of a nonmagnetic material and disposed around the main pole 15 and the first and second side shields 16C and 16D. An example of the nonmagnetic material used to form the first nonmagnetic layer is an insulating material such as alumina.

The buffer layer 59 is located near the medium facing surface 80, lies on the top surface 15T of the main pole 15 and is in contact with the top surface 15T of the main pole 15. The spin torque oscillator 60 lies on the buffer layer 59.

The write head unit 9 further includes a second gap layer 19 formed of a nonmagnetic material. As illustrated in FIG. 6, the second gap layer 19 includes a first portion 19A and a second portion 19B located on opposite sides of the buffer layer 59 and the spin torque oscillator 60 in the track width direction (the X direction). The first portion 19A lies on the first side shield 16C and the first gap layer 18. The second portion 19B lies on the second side shield 16D and the first gap layer 18. An example of the nonmagnetic material used to form the second gap layer 19 is an insulating material such as alumina.

The write head unit 9 further includes: a nonmagnetic layer 61 formed of a nonmagnetic material and disposed on a first portion of the top surface 15T of the main pole 15, the first portion being located away from the buffer layer 59 and the spin torque oscillator 60; and an insulating layer 62 formed of an insulating material and disposed to cover the main pole 15 and the nonmagnetic layer 61. The nonmagnetic layer 61 is formed of silicon oxide, for example. The insulating layer 62 is formed of alumina, for example.

The trailing shield 16A is disposed on the first and second side shields 16C and 16D, the second gap layer 19, the spin torque oscillator 60 and the insulating layer 62, and in contact with the top surfaces of the first and second side shields 16C and 16D, the second gap layer 19, the spin torque oscillator 60 and the insulating layer 62. In the medium facing surface 80, a portion of the front end face 16Aa of the trailing shield 16A is spaced a predetermined distance away from the end face 15a of the main pole 15. The predetermined distance is preferably in the range of 5 to 60 nm, and may be 30 to 60 nm, for example.

The upper return path section 40 includes coupling portions 41, 42, and 43. The coupling portion 41 lies on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15. The coupling portion 42 is disposed on the trailing shield 16A. The coupling portion 42 has an end face located in the medium facing surface 80.

As illustrated in FIG. 8, the upper coil portion 20 is wound around the coupling portion 41. The write head unit 9 further includes: an insulating film 63 formed of an insulating material and separating at least part of the upper coil portion 20 from the trailing shield 16A, the coupling portions 41 and 42 and the insulating layer 62; and a second nonmagnetic layer (not illustrated) formed of a nonmagnetic material and disposed around the trailing shield 16A, the upper coil portion 20 and the coupling portion 42. The insulating film 63 is formed of alumina, for example. An example of the nonmagnetic material used to form the second nonmagnetic layer is an insulating material such as alumina.

The write head unit 9 further includes an insulating layer 64 formed of an insulating material and disposed on the upper coil portion 20, the coupling portion 41 and the insulating film 63. The insulating layer 64 includes a first portion lying on the upper coil portion 20 and a second portion lying on the coupling portion 41. The second portion is smaller in maximum thickness (maximum dimension in the Z direction) than the first portion.

The coupling portion 43 is disposed on the coupling portion 42 and the insulating layer 64. The coupling portion 43 has an end face located in the medium facing surface 80. The coupling portion 43 includes a first portion lying on the coupling portion 42, a second portion lying over the coupling portion 41 with the insulating layer 64 interposed therebetween, and a third potion connecting the first and second portions. Note than the coupling portions 41 and 43 magnetically couple to each other even with the insulating layer 64 interposed between the coupling portion 41 and the second portion of the coupling portion 43.

The magnetic head 100 further includes a protective layer 70 formed of a nonmagnetic material and disposed to cover the write head unit 9. The protective layer 70 is formed of, e.g., an inorganic insulating material such as alumina.

As has been described, the magnetic head 100 according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 15, the write shield 16, the first gap layer 18, the second gap layer 19, the buffer layer 59, and the spin torque oscillator 60. The coil, the main pole 15, the write shield 16, the first gap layer 18, the second gap layer 19, the buffer layer 59, and the spin torque oscillator 60 are disposed above the top surface 1a of the substrate 1. The write shield 16 includes the trailing shield 16A, the leading shield 16B, and the first and second side shields 16C and 16D.

The write head unit 9 further includes the upper return path section 40 and the lower return path section 30. The upper return path section 40 includes the coupling portions 41, 42, and 43. The lower return path section 30 includes the coupling portions 31, 32, 33, 34, and 35.

The write shield 16 captures a disturbance magnetic field applied to the magnetic head 100 from outside the magnetic head 100. This makes it possible to prevent erroneous writing on the recording medium 90 that would be caused by the disturbance magnetic field being intensively captured into the main pole 15. The write shield 16 further has a function of capturing a magnetic flux that is generated from the end face 15a of the main pole 15 and spreads in directions other than the direction perpendicular to the plane of the recording medium 90, and thereby preventing the magnetic flux from reaching the recording medium 90. Furthermore, the write shield 16, the upper return path section 40 and the lower return path section 30 have a function of causing a magnetic flux that has been generated from the end face 15a of the main pole 15 and has magnetized a portion of the recording medium 90 to flow back.

The spin torque oscillator 60 is electrically connected to the main pole 15 and the trailing shield 16A. In the present embodiment, specifically, the spin torque oscillator 60 is electrically connected to the main pole 15 via the buffer layer 59. As illustrated in FIG. 5, the magnetic head 100 further includes: two terminals 81 and 82 connected to a power source (not illustrated); wiring 83 for electrically connecting the terminal 81 and the main pole 15; and wiring 84 for electrically connecting the terminal 82 and the coupling portion 43. The trailing shield 16A is electrically connected to the coupling portion 43 via the coupling portion 42. A current for operating the spin torque oscillator 60, which will hereinafter be referred to as a driving current, is supplied via the terminals 81 and 82. The driving current flows through the main pole 15, the buffer layer 59, the spin torque oscillator 60, the trailing shield 16A, the coupling portion 42, and the coupling portion 43 in this order.

Figure 4:
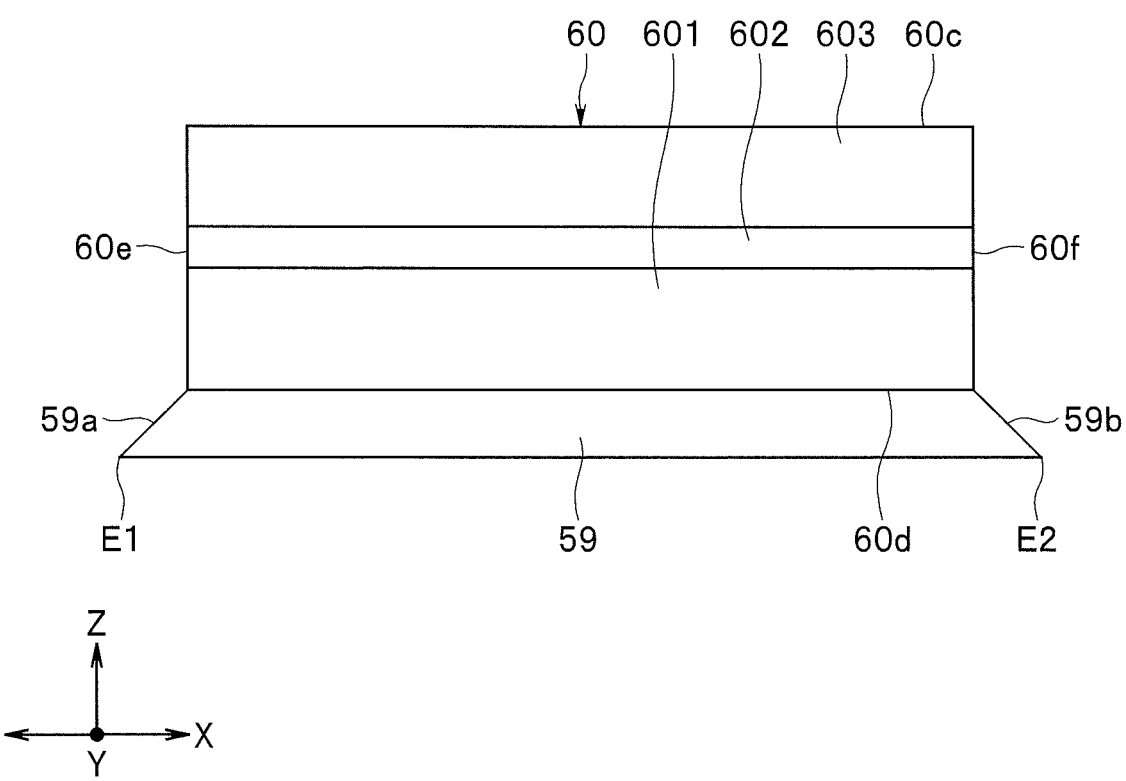
FIG. 4 is a front view illustrating a spin torque oscillator and a buffer layer in the magnetic head according to the first embodiment of the invention.

Reference is now made to FIG. 4 to describe a configuration of the spin torque oscillator 60. FIG. 4 is a front view illustrating the spin torque oscillator 60 and the buffer layer 59. The spin torque oscillator 60 illustrated in FIG. 4 is one configured to generate a microwave magnetic field. This spin torque oscillator 60 includes a magnetic-field generating layer 601, a nonmagnetic layer 602, and a spin injection layer 603 stacked in this order, from closest to farthest from the buffer layer 59.

The magnetic-field generating layer 601 is formed of a material whose magnetization direction is parallel or almost parallel to the film plane when no driving current flows. The magnetic-field generating layer 601 may be a magnetic layer formed of FeCo, FeCoAl, FeCoSi, FeCoB, or FeNi, a layered film composed of alternately stacked layers of FeCo and Ni, or a layered film composed of alternately stacked layers of Fe and Co.

The nonmagnetic layer 602 is formed of a material having high spin permeability. The nonmagnetic layer 602 may be a nonmagnetic metal layer formed of one of Ag, Au, Cr, and Al, or a tunnel barrier layer formed of MgO or $Al_2O_3$.

The spin injection layer 603 is formed of a material having magnetic anisotropy in a direction perpendicular to the film plane. The spin injection layer 603 may be a layered film composed of alternately stacked layers of CoFe and Ni, a layered film composed of alternately stacked layers of Co and Pt, a layered film composed of alternately stacked layers of Co and Pd, or an alloy layer formed of one of CoPt, FePt, and MnGa.

The spin torque oscillator 60 may further include a protective layer disposed on the spin injection layer 603. The protective layer is formed of a nonmagnetic metal material. For example, the protective layer is formed of one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

In the spin torque oscillator 60 illustrated in FIG. 4, passing a driving current in the direction from the magnetic-field generating layer 601 to the spin injection layer 603 imparts a spin torque to the magnetization of the magnetic-field generating layer 601 to cause precession of the magnetization of the magnetic-field generating layer 601. As a result, a microwave magnetic field is generated from the magnetic-field generating layer 601.

Figure 1:
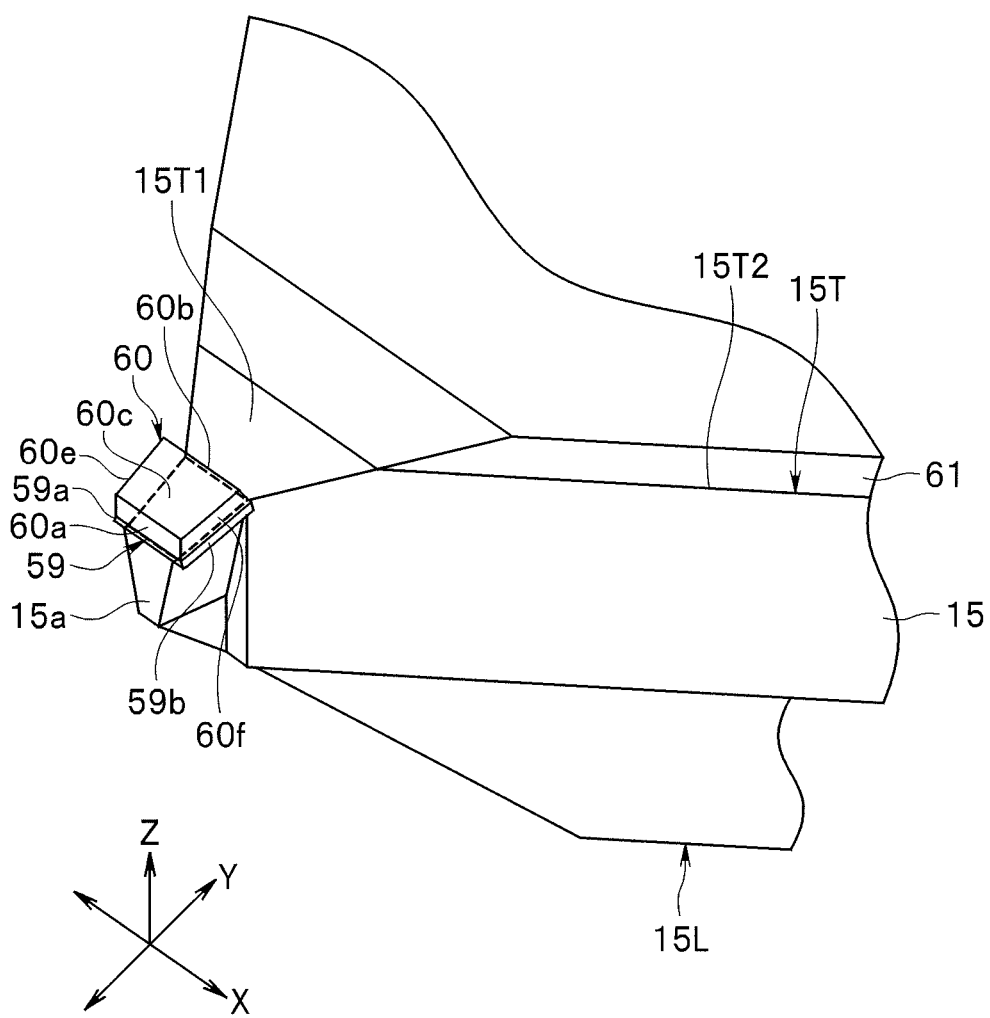
FIG. 1 is a perspective view illustrating essential parts of a magnetic head according to a first embodiment of the invention.
Figure 2:
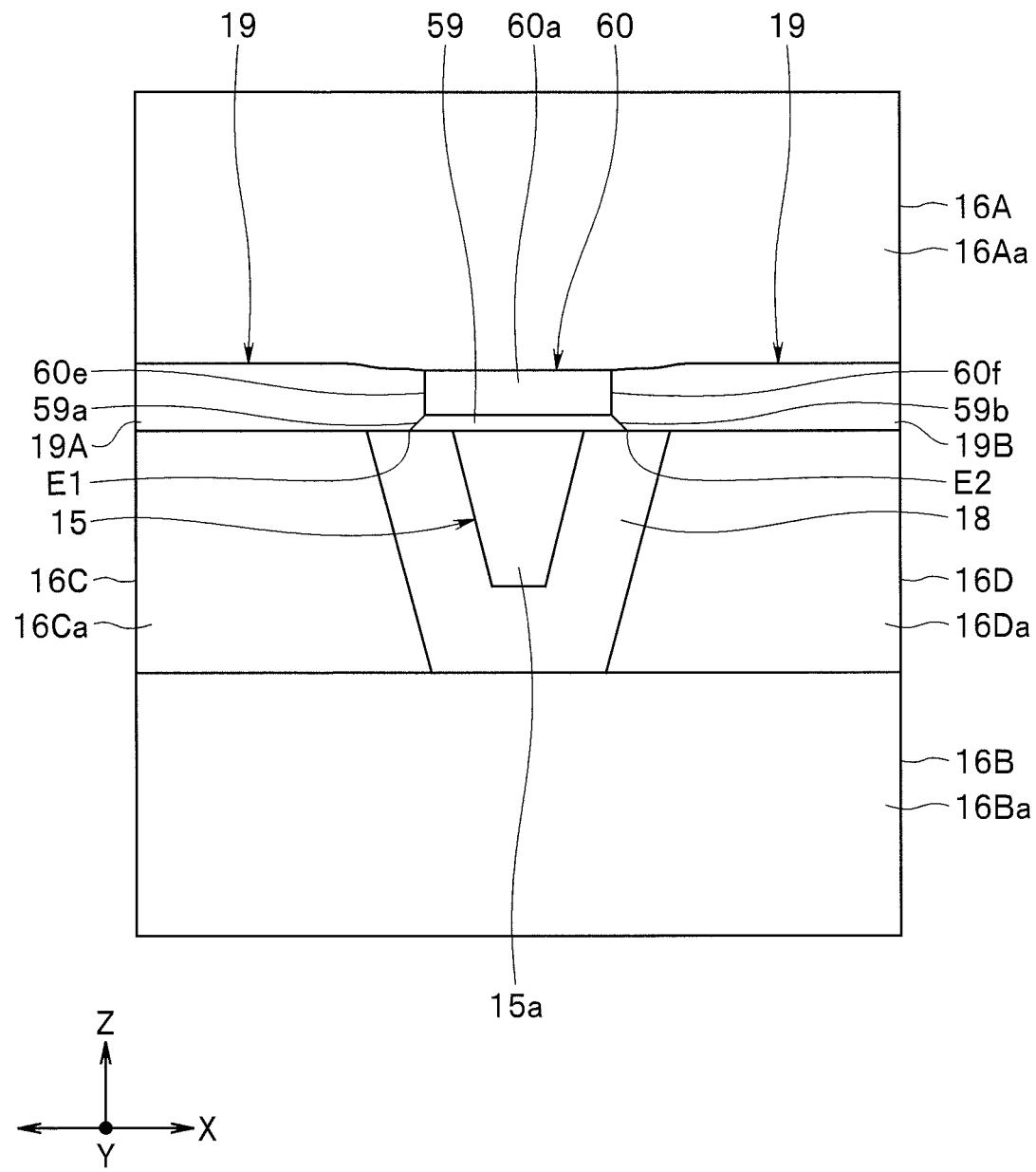
FIG. 2 is a front view illustrating essential parts of the magnetic head according to the first embodiment of the invention.
Figure 3:
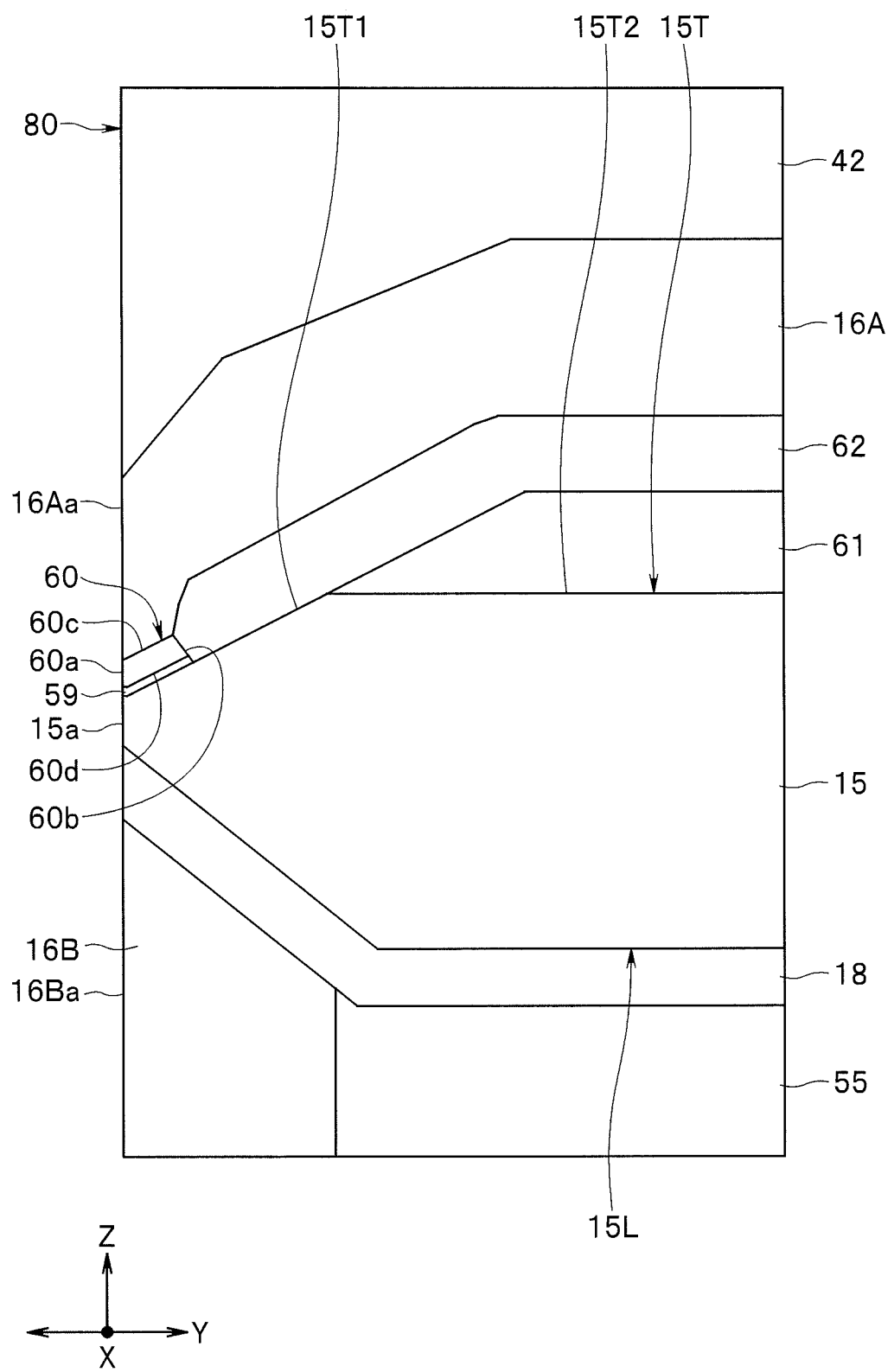
FIG. 3 is a cross-sectional view illustrating essential parts of the magnetic head according to the first embodiment of the invention.

Now, the shape of the main pole 15 will be described in detail with reference to FIG. 1 to FIG. 3, FIG. 5, FIG. 7, and FIG. 8. FIG. 1 is a perspective view illustrating essential parts of the magnetic head 100. FIG. 2 is a front view illustrating essential parts of the magnetic head 100. FIG. 3 is a cross-sectional view illustrating essential parts of the magnetic head 100.

As illustrated in FIG. 7 and FIG. 8, the main pole 15 includes a track width defining portion 15A having the end face 15a and an end opposite thereto, and a wide portion 15B connected to the end of the track width defining portion 15A. The main pole 15 has the top surface 15T, the bottom end 15L, the first side surface and the second side surface. Hereinafter, a width in the track width direction (the X direction) will be simply referred to as a width. The width of the top surface 15T is greater in the wide portion 15B than in the track width defining portion 15A. The width of the top surface 15T in the track width defining portion 15A gradually increases with increasing distance from the medium facing surface 80, and then becomes constant.

As illustrated in FIG. 1 and FIG. 3, the top surface 15T includes an inclined portion 15T1 and a flat portion 15T2, the inclined portion 15T1 being closer to the medium facing surface 80 than the flat portion 15T2. The inclined portion 15T1 has a first end closest to the medium facing surface 80 and a second end opposite thereto. The flat portion 15T2 is connected to the second end of the inclined portion 15T1. The inclined portion 15T1 is inclined such that the second end is located forward relative to the first end in the direction of travel of the recording medium 90 (the Z direction). The flat portion 15T2 extends substantially in a direction perpendicular to the medium facing surface 80 (the Y direction).

As illustrated in FIG. 3, the bottom end 15L includes a first inclined portion and a first flat portion, the first inclined portion being closer to the medium facing surface 80 than the first flat portion. The first inclined portion has a third end located in the medium facing surface 80, and a fourth end opposite thereto. The first inclined portion may be an edge formed by two intersecting surfaces, or may be a surface connecting two surfaces to each other. The first flat portion is a surface connected to the fourth end of the first inclined portion. The first inclined portion is inclined such that the fourth end is located backward relative to the third end in the direction of travel of the recording medium 90 (the Z direction). The first flat portion extends substantially in a direction perpendicular to the medium facing surface 80 (the Y direction).

As illustrated in FIG. 5, the bottom end 15L further includes a second inclined portion and a second flat portion. The second inclined portion is a surface connected to an end of the first flat portion opposite from the first inclined portion. The second flat portion is a surface connected to an end of the second inclined portion opposite from the first flat portion. The second inclined portion is inclined in a manner similar to that in which the first inclined portion is inclined. The second flat portion extends substantially in a direction perpendicular to the medium facing surface 80 (the Y direction), like the first flat portion.

As illustrated in FIG. 2, the end face 15a of the main pole 15 has a top edge farthest from the top surface 1a of the substrate 1, a first side edge connected to one end of the top edge, and a second side edge connected to the other end of the top edge. In the present embodiment, specifically, the top edge is in contact with the buffer layer 59. The top edge defines the track width. The position of an end of a recording bit to be recorded on the recording medium 90 is determined by the position of the top edge. The width in the track width direction of the end face 15a of the main pole 15 decreases with increasing distance from the top edge, i.e., with decreasing distance to the top surface 1a of the substrate 1.

Each of the first side edge and the second side edge forms an angle in the range of, for example, 7° to 17°, preferably 10° to 15°, with respect to a direction perpendicular to the top surface 1a of the substrate 1. The top edge has a length in the range of 0.05 to 0.20 μm, for example.

Next, the shapes and positions of the buffer layer 59 and the spin torque oscillator 60 will be described in detail with reference to FIG. 1 to FIG. 4. As illustrated in FIG. 1 to FIG. 4, the spin torque oscillator 60 has a front end face 60a facing the medium facing surface 80, a rear end face 60b farthest from the medium facing surface 80, a top surface 60c farthest from the top surface 1a of the substrate 1, a bottom surface 60d closest to the top surface 1a of the substrate 1, and a first side surface 60e and a second side surface 60f opposite to each other in the track width direction (the X direction). In the present embodiment, specifically, the front end face 60a is located in the medium facing surface 80.

The top surface 60c is in contact with the trailing shield 16A. The bottom surface 60d is in contact with the buffer layer 59. The first and second side surfaces 60e and 60f are perpendicular or substantially perpendicular to the top surface 1a (see FIG. 5 and FIG. 6) of the substrate 1. The first side surface 60e and the second side surface 60f respectively form a first angle and a second angle with respect to a direction perpendicular to the top surface 1a of the substrate 1. The first angle and the second angle each fall within the range of 0° to 10°.

As illustrated in FIG. 1 and FIG. 3, the buffer layer 59 lies on the inclined portion 15T1 of the top surface 15T of the main pole 15. As illustrated in FIG. 1 to FIG. 4, the buffer layer 59 has an end face located in the medium facing surface 80, a top surface farthest from the top surface 1a of the substrate 1, a bottom surface closest to the top surface 1a of the substrate 1, and a third side surface 59a and a fourth side surface 59b opposite to each other in the track width direction (the X direction). The top surface of the buffer layer 59 is in contact with the bottom surface 60d of the spin torque oscillator 60. The bottom surface of the buffer layer 59 is in contact with the inclined portion 15T1 of the top surface 15T of the main pole 15.

As illustrated in FIG. 2 and FIG. 4, the third side surface 59a of the buffer layer 59 is contiguous with the first side surface 60e of the spin torque oscillator 60. The third side surface 59a includes a first inclined portion inclined with respect to the direction perpendicular to the top surface 1a of the substrate 1 (see FIG. 5 and FIG. 6). In the present embodiment, specifically, the entirety of the third side surface 59a corresponds to the first inclined portion. The first inclined portion, i.e., the third side surface 59a forms a third angle greater than the aforementioned first angle with respect to the direction perpendicular to the top surface 1a of the substrate 1. The third angle falls within the range of, e.g., 10° to 70°. If the first angle is 10°, the third angle is greater than 10°.

As illustrated in FIG. 2 and FIG. 4, the fourth side surface 59b of the buffer layer 59 is contiguous with the second side surface 60f of the spin torque oscillator 60. The fourth side surface 59b includes a second inclined portion inclined with respect to the direction perpendicular to the top surface 1a of the substrate 1 (see FIG. 5 and FIG. 6). In the present embodiment, specifically, the entirety of the fourth side surface 59b corresponds to the second inclined portion. The second inclined portion, i.e., the fourth side surface 59b forms a fourth angle greater than the aforementioned second angle with respect to the direction perpendicular to the top surface 1a of the substrate 1. The fourth angle falls within the range of, e.g., 10° to 70°. If the second angle is 10°, the fourth angle is greater than 10°.

As illustrated in FIG. 2 and FIG. 4, the third side surface 59a has a bottom edge E1 closest to the top surface 1a of the substrate 1. The fourth side surface 59b has a bottom edge E2 closest to the top surface 1a of the substrate 1. As illustrated in FIG. 2, the bottom edges E1 and E2 are in contact with the second gap layer 19. The buffer layer 59 is thus not in contact with the first side shield 16C or the second side shield 16D.

Reference is now made to FIG. 7 and FIG. 8 to describe the connection relationship between the upper coil portion 20 and the lower coil portion 10 of the coil. As illustrated in FIG. 7, the lower coil portion 10 has a coil connection 10E electrically connected to the upper coil portion 20. As illustrated in FIG. 8, the upper coil portion 20 has a coil connection 20S electrically connected to the coil connection 10E of the lower coil portion 10. The coil connection 20S is electrically connected to the coil connection 10E via a first and a second connection layer of columnar shape (not illustrated) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example illustrated in FIG. 7 and FIG. 8, the upper coil portion 20 and the lower coil portion 10 are connected in series.

Next, a manufacturing method for the magnetic head 100 according to the present embodiment will be described. The manufacturing method for the magnetic head 100 according to the present embodiment starts with forming the insulating layer 2, the first read shield layer 3, and the MR element 5 in this order on the substrate 1, as illustrated in FIG. 5 and FIG. 6. Next, the insulating layer 6 is formed around the MR element 5. The second read shield layer 7, the nonmagnetic layer 71, the middle shield layer 72, and the nonmagnetic layer 73 are then formed in this order over the MR element 5 and the insulating layer 6.

Next, the coupling portion 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the coupling portion 31 is exposed. Next, the coupling portions 32 and 33 are formed on the coupling portion 31 by frame plating, for example. The insulating film 52 is then formed over the entire top surface of the stack. Next, the lower coil portion 10 is formed by frame plating, for example. The insulating layer 53 is then formed over the entire top surface of the stack. The insulating film 52 and the insulating layer 53 are then polished by, for example, CMP, until the lower coil portion 10 and the coupling portions 32 and 33 are exposed.

Next, the coupling portion 32 and the insulating layer 53 are etched to form therein an accommodation part to accommodate the coupling portion 34. Then, the coupling portion 34 is formed to be accommodated in the accommodation part. The insulating layer 54 is then formed over the entire top surface of the stack. Next, the insulating layer 54 is selectively etched to form therein a first opening for exposing the top surface of the coupling portion 34 and a second opening for exposing the coil connection 10E (see FIG. 7) of the lower coil portion 10. Then, the leading shield 16B is formed on the coupling portion 34 at the position of the first opening, the coupling portion 35 is formed on a portion of the insulating layer 54 covering the top surface of the coupling portion 33, and the first connection layer (not illustrated) is formed on the coil connection 10E at the position of the second opening, by performing frame plating, for example.

Next, the nonmagnetic layer 55 is formed over the entire top surface of the stack. The nonmagnetic layer 55 is then polished by, for example, CMP, until the leading shield 16B, the coupling portion 35 and the first connection layer are exposed. Then, the leading shield 16B and the nonmagnetic layer 55 are taper-etched in part by, for example, ion beam etching (hereinafter referred to as IBE) so as to provide the top surface of the leading shield 16B with a portion to be opposed to the first inclined portion (see FIG. 2) of the bottom end 15L of the main pole 15 to be formed later, and provide the top surface of the nonmagnetic layer 55 with a portion to be opposed to the second inclined portion (see FIG. 5) of the bottom end 15L of the main pole 15 to be formed later. The coupling portion 35 and the first connection layer are also etched in part by this etching.

Next, the first and second side shields 16C and 16D are formed on the leading shield 16B by, for example, frame plating. The first gap layer 18 is then formed to cover the leading shield 16B and the first and second side shields 16C and 16D. In the case of using alumina as the material of the first gap layer 18, the first gap layer 18 is formed by atomic layer deposition (herein after referred to as ALD), for example. The first gap layer 18 is then selectively etched to form therein an opening for exposing the top surface of the coupling portion 35, and an opening for exposing the top surface of the first connection layer. Next, an initial main pole, which becomes the main pole 15 later, and the second connection layer (not illustrated) are formed by frame plating, for example. The initial main pole and the second connection layer are formed such that their top surfaces are higher in level than portions of the first gap layer 18 that are located on the first and second side shields 16C and 16D.

Next, the first nonmagnetic layer (not illustrated) is formed over the entire top surface of the stack. The initial main pole, the second connection layer, the first gap layer 18, and the first nonmagnetic layer are then polished by, for example, CMP until the first and second side shields 16C and 16D are exposed. Next, the nonmagnetic layer 61 is formed on the initial main pole. The initial main pole and the nonmagnetic layer 61 are then taper-etched so as to provide the initial main pole with the inclined portion 15T1 (see FIG. 1 and FIG. 3) of the top surface 15T of the main pole 15. This makes the initial main pole into the main pole 15. The first and second side shields 16C and 16D, the first gap layer 18, and the first nonmagnetic layer are also etched in part by this etching.

Figure 19:
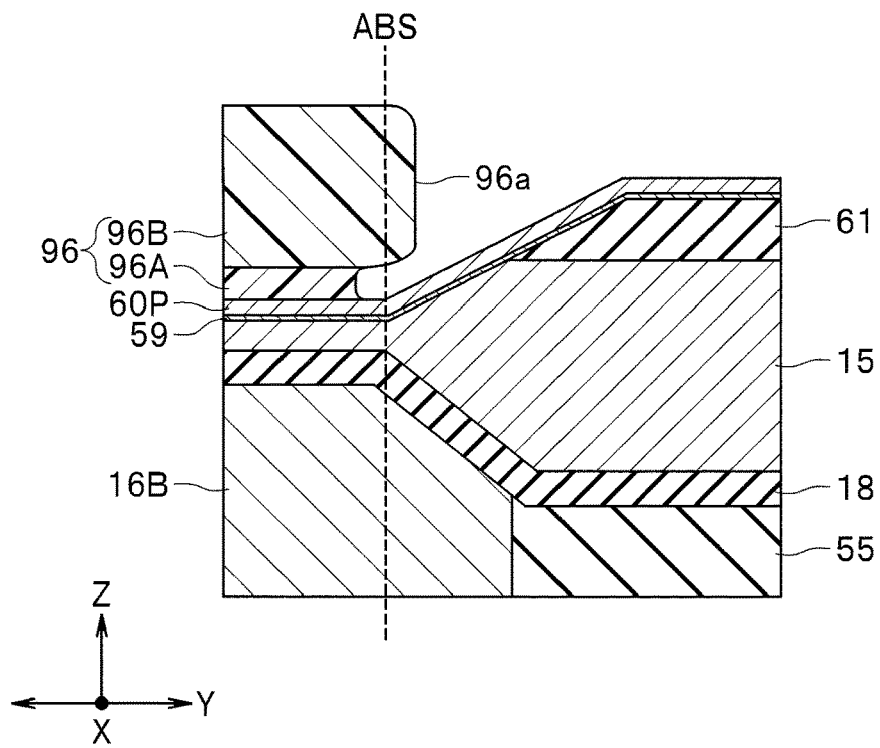
FIG. 19 is a cross-sectional view illustrating a step that follows the step illustrated in FIG. 18.
Figure 20:
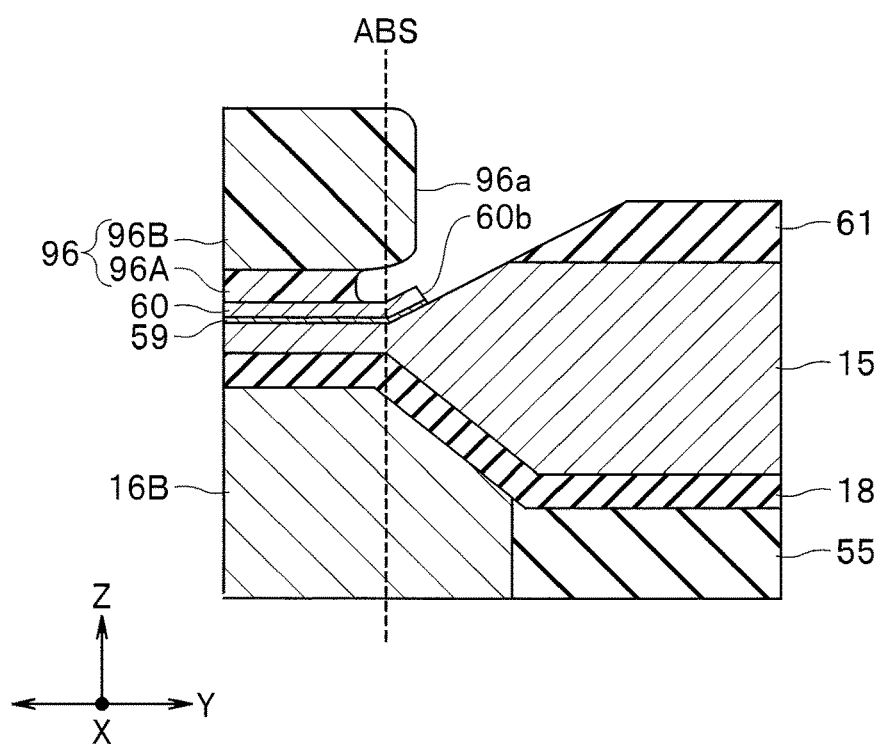
FIG. 20 is a cross-sectional view illustrating a step that follows the step illustrated in FIG. 19.

Reference is now made to FIG. 9 to FIG. 21 to describe a series of steps to be performed after the foregoing step up to the formation of the trailing shield 16A. FIG. 9 to FIG. 21 each illustrate a stack of layers formed in the process of manufacturing the magnetic head 100. FIG. 9 to FIG. 21 omit the illustration of portions that are closer to the substrate 1 relative to the leading shield 16B and the nonmagnetic layer 55. FIG. 9 to FIG. 18 and FIG. 21 each illustrate a cross section of the stack taken at the position where the medium facing surface 80 is to be formed. FIG. 19 and FIG. 20 each illustrate a cross section perpendicular to the medium facing surface 80 and the top surface 1a of the substrate 1. In FIG. 19 and FIG. 20 the symbol ABS represents the position where the medium facing surface 80 is to be formed.

Figure 9:
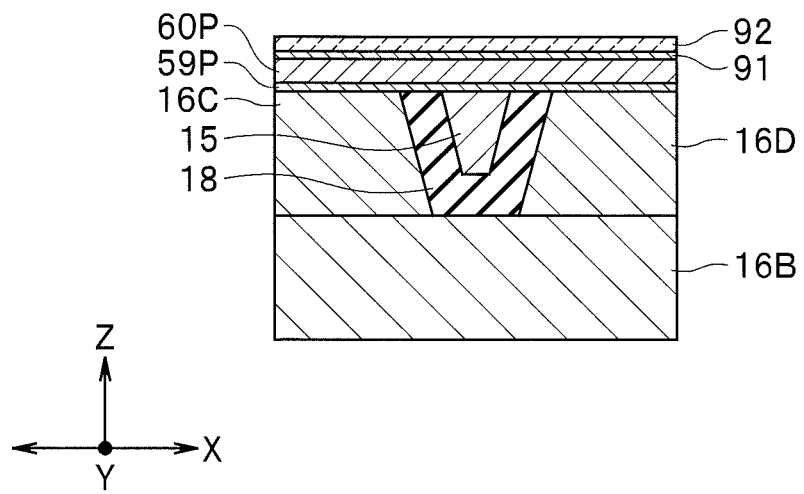
FIG. 9 is a cross-sectional view illustrating a step of a manufacturing method for the magnetic head according to the first embodiment of the invention.

FIG. 9 illustrates a step following the formation of the main pole 15. In this step, first, an initial buffer layer 59P, which becomes the buffer layer 59 later, is formed on the stack including the main pole 15. Next, a layered film 60P, which becomes the spin torque oscillator 60 later, is formed on the initial buffer layer 59P. As in the example illustrated in FIG. 4, the spin torque oscillator 60 is composed of a plurality of layers. The layered film 60P includes all the layers to constitute the spin torque oscillator 60.

In the step illustrated in FIG. 9, a nonmagnetic metal layer 91 of Ru is then formed on the layered film 60P. The nonmagnetic metal layer 91 has a thickness in the range of 5 to 10 nm, for example. Next, a protective layer 92 is formed on the layered film 60P and the nonmagnetic metal layer 91. The protective layer 92 is what is called a hard mask, and is formed of an inorganic material. In the present embodiment, specifically, the protective layer 92 is formed of carbon. The protective layer 92 has a thickness in the range of 2 to 20 nm, for example. Note that diamond-like carbon may be used as the carbon. In the case of using diamond-like carbon as the material of the protective layer 92, the protective layer 92 is formed by chemical vapor deposition, for example. In such a case, the thickness of the protective layer 92 falls within the range of 2 to 10 nm, for example.

Figure 10:
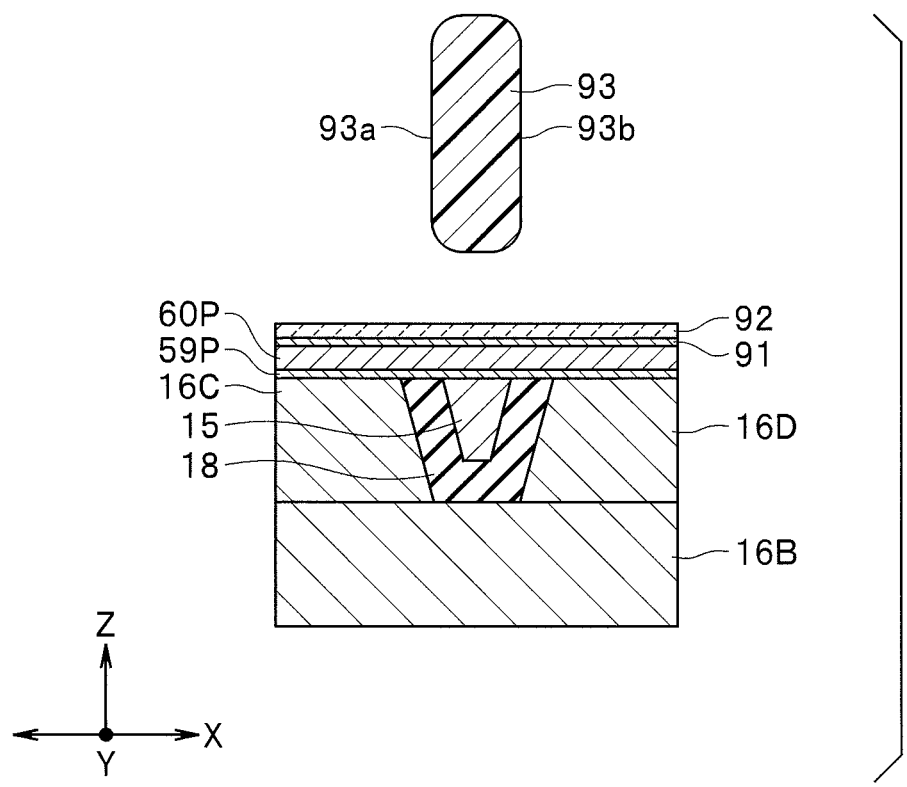
FIG. 10 is a cross-sectional view illustrating a step that follows the step illustrated in FIG. 9.

FIG. 10 illustrates the next step. In this step, a mask 93 is formed on the protective layer 92. The mask 93 includes a lower layer lying on the protective layer 92 and an upper layer lying on the lower layer. The upper layer is formed of a photoresist patterned by photolithography. The lower layer is formed of, for example, a material that dissolves in a developing solution used in patterning the upper layer. When the upper layer is patterned, a portion of the lower layer located in and near a cross section taken at the position where the medium facing surface 80 is to be formed is removed. As a result, as illustrated in FIG. 10, a gap develops between the protective layer 92 and the mask 93 in the cross section taken at the position where the medium facing surface 80 is to be formed. Note that even if the foregoing portion of the lower layer is removed, the mask 93 will not peel away since the lower layer remains between the protective layer 92 and the upper layer except in and near the cross section taken at the position where the medium facing surface 80 is to be formed. In this way, in the present embodiment, the mask 93 is located at a distance from the protective layer 92 in the cross section taken at the position where the medium facing surface 80 is to be formed.

The mask 93 has a thickness in the range of 300 to 500 nm, for example. In the cross section taken at the position where the medium facing surface 80 is to be formed, the mask 93 has a width in the range of 40 to 80 nm, for example. The mask 93 has a first sidewall 93a defining the shape and the position of each of the first side surface 60e of the spin torque oscillator 60 and the third side surface 59a of the buffer layer 59, and a second sidewall 93b defining the shape and the position of each of the second side surface 60f of the spin torque oscillator 60 and the fourth side surface 59b of the buffer layer 59. The first and second sidewalls 93a and 93b are perpendicular to the top surface 1a of the substrate 1.

Figure 11:
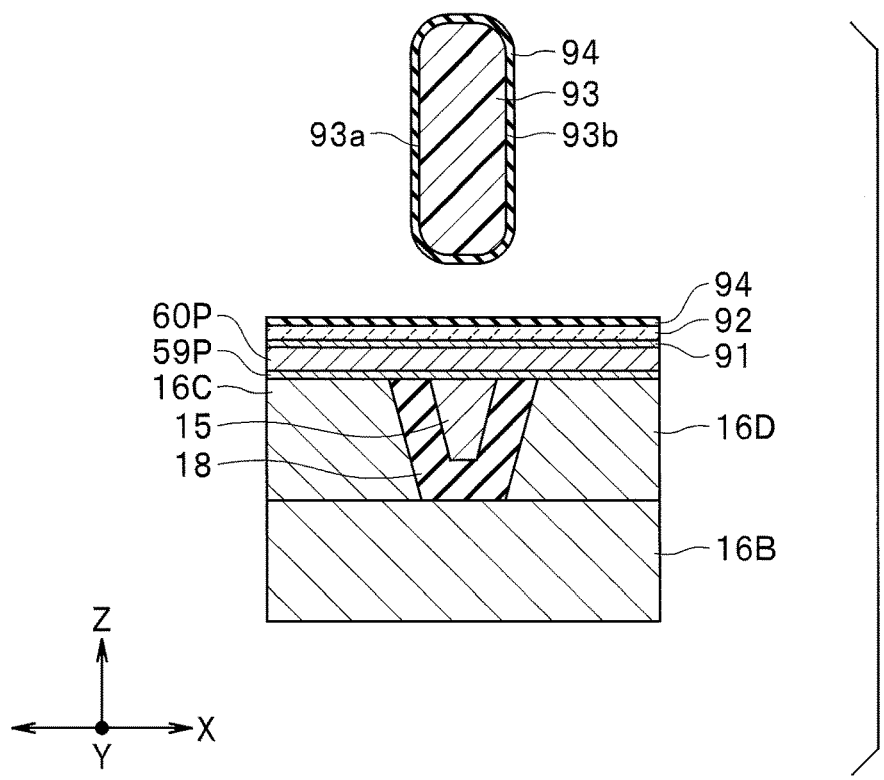
FIG. 11 is a cross-sectional view illustrating a step that follows the step illustrated in FIG. 10.

FIG. 11 illustrates the next step. In this step, an inorganic material layer 94 of an inorganic material such as alumina is formed on the protective layer 92. The inorganic material layer 94 is formed also on the surface of the mask 93. In the case of using alumina as the material of the inorganic material layer 94, the inorganic material layer 94 is formed by low-temperature ALD, which is a technique to deposit films at lower temperatures compared to normal ALD. An example of deposition temperatures in normal ALD is 200° C. An example of deposition temperatures in the low-temperature ALD employed to form the inorganic material layer 94 falls within the range of 80° C. to 90° C. The inorganic material layer 94 has a thickness in the range of 10 to 20 nm, for example.

Figure 12:
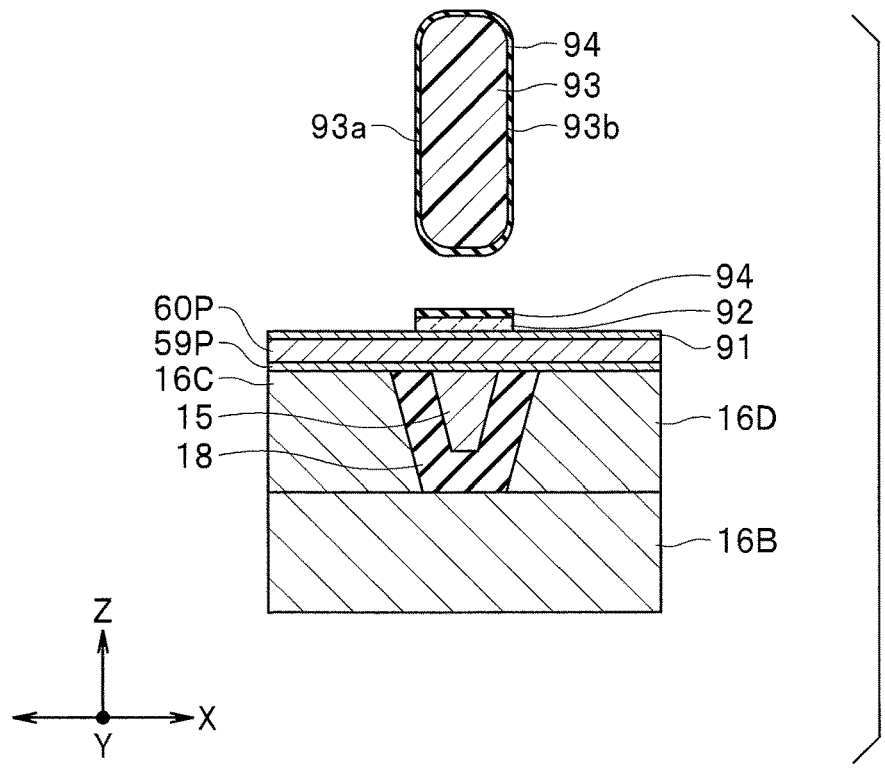
FIG. 12 is a cross-sectional view illustrating a step that follows the step illustrated in FIG. 11.

FIG. 12 illustrates the next step. In this step, first, the inorganic material layer 94 is etched in part by using the mask 93. This etching is performed by reactive ion etching (hereinafter referred to as RIE). In the case where the inorganic material layer 94 is of alumina, a gas containing $BCl_3$ is used as an etching gas. This etching removes a portion of the inorganic material layer 94 that is not covered with the mask 93. The portion not covered with the mask 93 refers to a portion that does not overlap the mask 93 as viewed from above the mask 93.

Next, a first etching step is performed. The first etching step is a step of etching a portion of the protective layer 92 by using the mask 93. The first etching step is performed by RIE. In the case where the protective layer 92 is of carbon, a gas containing $O_2$ is used as an etching gas. The nonmagnetic metal layer 91 functions as an etching stopper to stop etching when the protective layer 92 is etched by RIE. The first etching step removes the portion of the protective layer 92 not covered with the mask 93 or the inorganic material layer 94.

Figure 13:
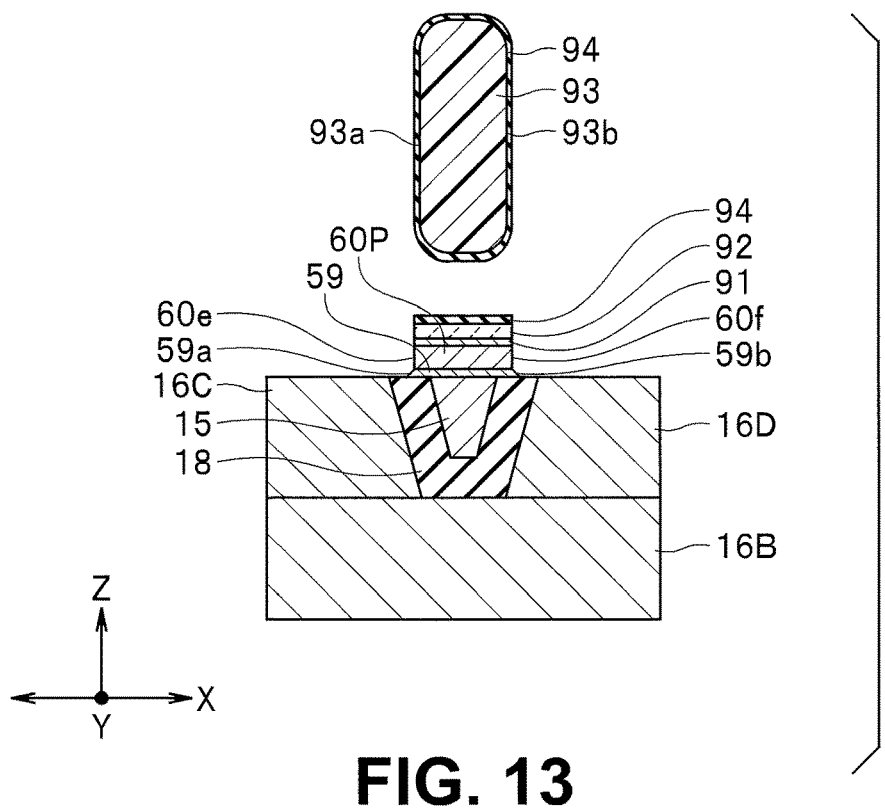
FIG. 13 is a cross-sectional view illustrating a step that follows the step illustrated in FIG. 12.

FIG. 13 illustrates the next step. In this step, a second etching step is performed. The second etching step is a step of etching a portion of each of the layered film 60P and the initial buffer layer 59P by using the mask 93 and the protective layer 92 as an etching mask. In the second etching step, the portion of each of the layered film 60P and the initial buffer layer 59P is etched so as to provide the layered film 60P with the first and second side surfaces 60e and 60f of the spin torque oscillator 60 and provide the initial buffer layer 59P with the third and fourth side surfaces 59a and 59b of the buffer layer 59. The second etching step removes the portion of the layered film 60P not covered with the mask 93, the inorganic material layer 94 or the protective layer 92. Further, the second etching step removes the portion of the initial buffer layer 59P not covered with the mask 93, the inorganic material layer 94, the protective layer 92 or the layered film 60P. Providing the initial buffer layer 59P with the third and fourth side surfaces 59a and 59b makes the initial buffer layer 59P into the buffer layer 59.

The second etching step is performed by IBE, for example. In the second etching step, flying substances generated during the etching of the layered film 60P and the initial buffer layer 59P can deposit onto the layered film 60P and the initial buffer layer 59P to form a re-deposition film on the surfaces of the layered film 60P and the initial buffer layer 59P. In the case of employing IBE, it is possible to eliminate the re-deposition film by inclining the direction of travel of ion beams with respect to the direction perpendicular to the top surface 1a of the substrate 1 after the layered film 60P and the initial buffer layer 59P are etched with the direction of travel of the ion beams set to be perpendicular or substantially perpendicular to the top surface 1a of the substrate 1. With respect to the direction perpendicular to the top surface 1a of the substrate 1, the direction of travel of the ion beams forms an angle in the range of, e.g., 0° to 10° before the aforementioned inclination operation, and an angle in the range of, e.g., 50° to 75° after the aforementioned inclination operation.

Figure 14:
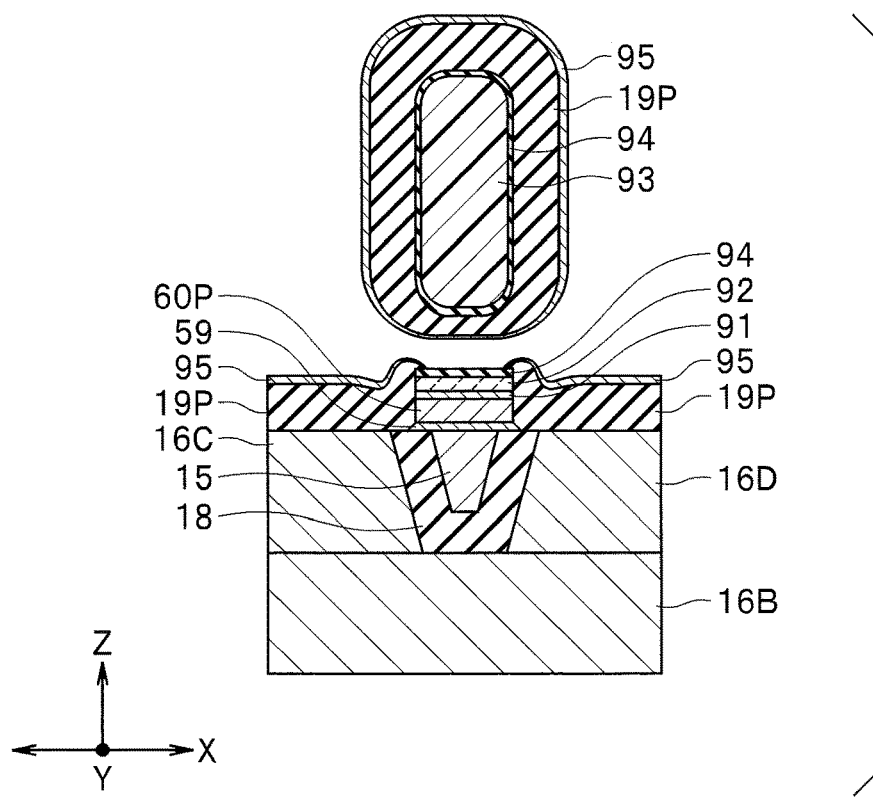
FIG. 14 is a cross-sectional view illustrating a step that follows the step illustrated in FIG. 13.
Figure 15:
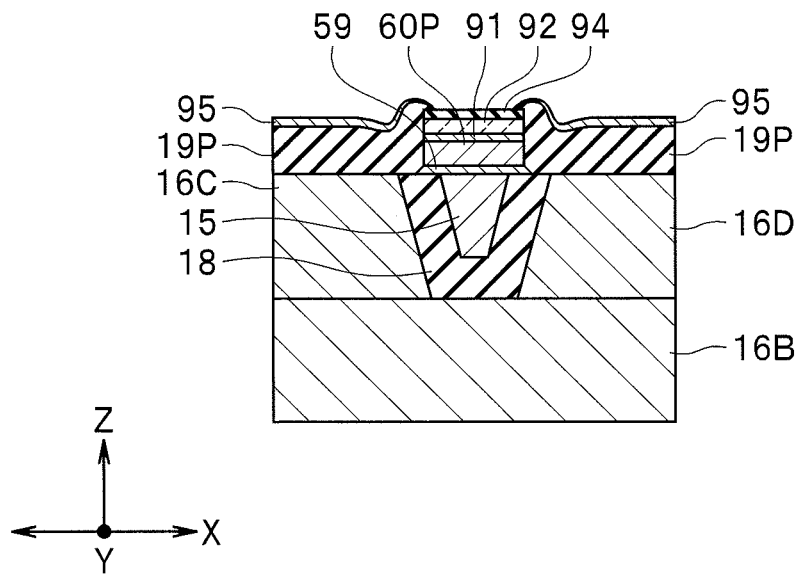
FIG. 15 is a cross-sectional view illustrating a step that follows the step illustrated in FIG. 14.

FIG. 14 illustrates the next step. In this step, first, with the mask 93 left intact, a nonmagnetic layer 19P for forming the second gap layer 19 is formed over the first gap layer 18 and the first and second side shields 16C and 16D by ion beam deposition, for example. Then, a nonmagnetic metal layer 95 of Ru is formed with the mask 93 left intact. Then, as illustrated in FIG. 15, the mask 93 is lifted off.

Figure 16:
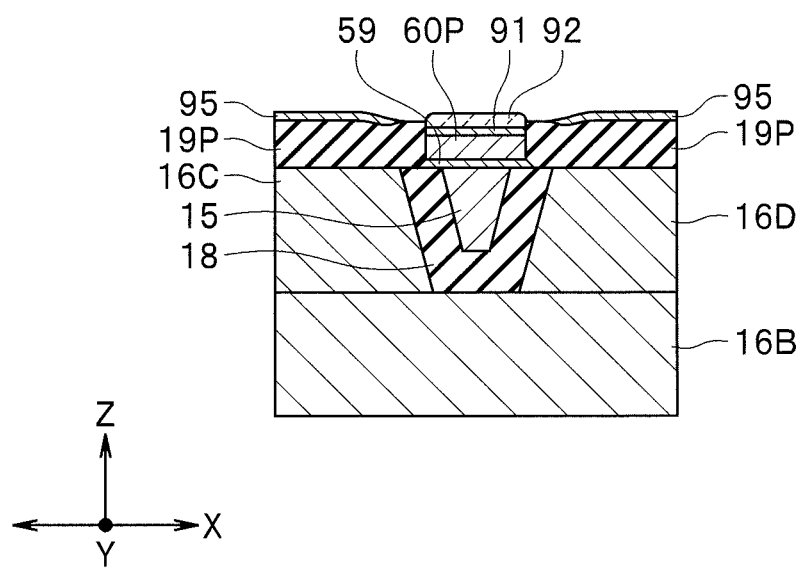
FIG. 16 is a cross-sectional view illustrating a step that follows the step illustrated in FIG. 15.

FIG. 16 illustrates the next step. In this step, the nonmagnetic layer 19P, the inorganic material layer 94, and the nonmagnetic metal layer 95 are etched so that the inorganic material layer 94 covering the protective layer 92 is removed. For example, either IBE or wet etching, or both are employed to etch the nonmagnetic layer 19P, the inorganic material layer 94, and the nonmagnetic metal layer 95.

Figure 17:
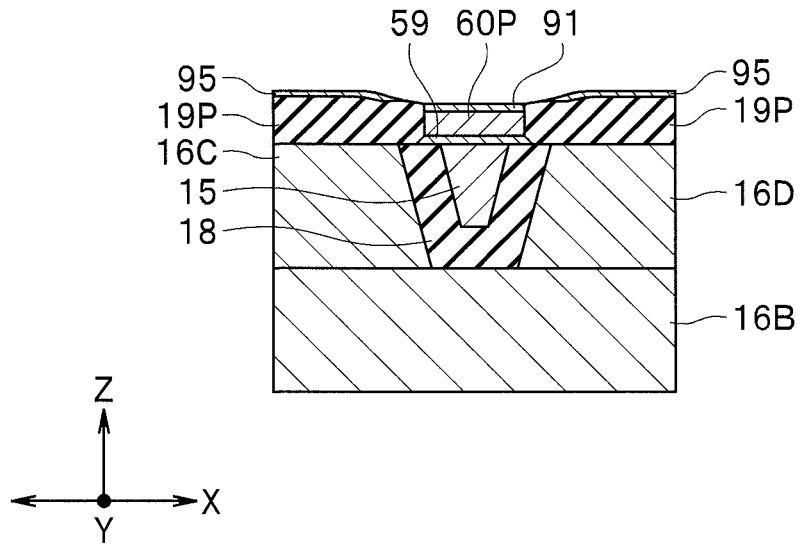
FIG. 17 is a cross-sectional view illustrating a step that follows the step illustrated in FIG. 16.

FIG. 17 illustrates the next step. In this step, first, the protective layer 92 is removed. In the case where the protective layer 92 is of carbon, the protective layer 92 is removed by ashing, for example. Next, a portion of the nonmagnetic layer 19P is etched by wet etching, for example.

Figure 18:
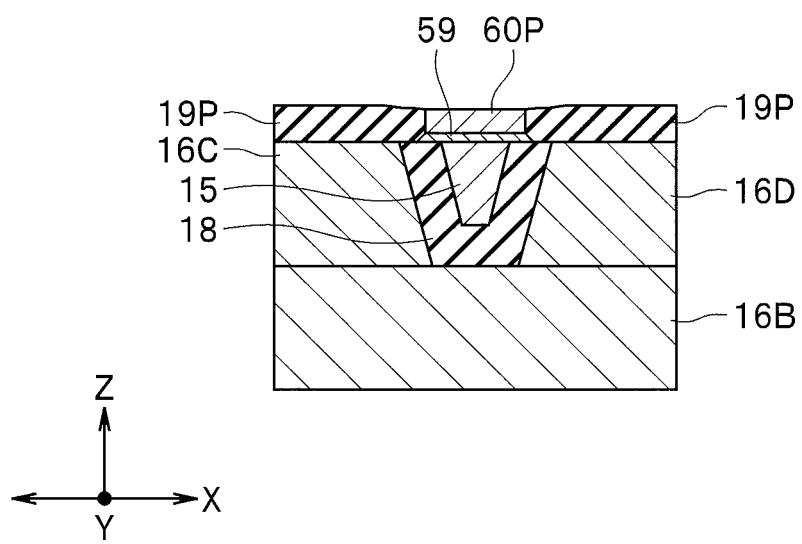
FIG. 18 is a cross-sectional view illustrating a step that follows the step illustrated in FIG. 17.

FIG. 18 illustrates the next step. In this step, the nonmagnetic metal layers 91 and 95 are removed and the top surface of the nonmagnetic layer 19P is etched by, for example, IBE.

FIG. 19 illustrates the next step. In this step, an etching mask 96 is formed on the layered film 60P. The etching mask 96 has an undercut. The etching mask 96 includes, for example, a lower layer 96A lying on the layered film 60P and an upper layer 96B lying on the lower layer 96A. The upper layer 96B is formed of a photoresist patterned by photolithography. The lower layer 96A is formed of, for example, a material that dissolves in a developing solution used in patterning the upper layer 96B. The etching mask 96 has a sidewall 96a defining the shape and the position of the rear end face 60b of the spin torque oscillator 60.

FIG. 20 illustrates the next step. In this step, a patterning step is performed. The patterning step is a step of patterning the layered film 60P so that the layered film 60P becomes the spin torque oscillator 60. In the patterning step, the layered film 60P is etched by, for example, IBE using the etching mask 96 so as to provide the layered film 60P with the rear end face 60b of the spin torque oscillator 60. This makes the layered film 60P into the spin torque oscillator 60. Further, in the patterning step, the buffer layer 59 is etched in succession to the etching of the layered film 60P. This etching removes a portion of the buffer layer 59 not covered with the etching mask 96 or the spin torque oscillator 60.

In the step illustrated in FIG. 20, the insulating layer 62 (see FIG. 5) is then formed over the entire top surface of the stack with the etching mask 96 left intact. The etching mask 96 is then lifted off.

Figure 21:
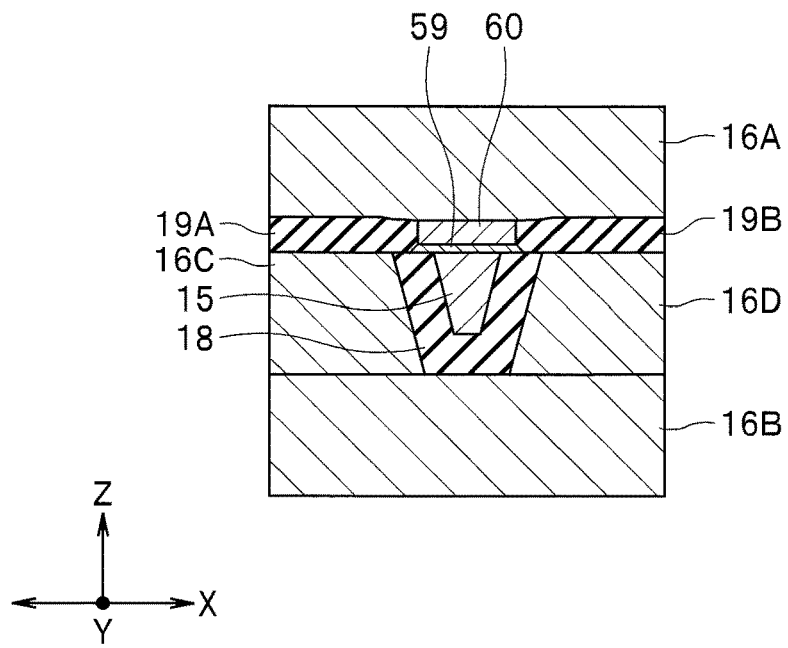
FIG. 21 is a cross-sectional view illustrating a step that follows the step illustrated in FIG. 20.

FIG. 21 illustrates the next step. In this step, first, the nonmagnetic layer 19P is selectively etched so that the top surfaces of the first and second side shields 16C and 16D are exposed in part. This forms the first and second portions 19A and 19B of the second gap layer 19. Next, the trailing shield 16A is formed over the first and second side shields 16C and 16D, the second gap layer 19, the spin torque oscillator 60 and the insulating layer 62 by frame plating, for example.

Steps following the formation of the trailing shield 16A will be described below with reference to FIG. 5 and FIG. 6. First, the nonmagnetic layer 61 and the insulating layer 62 are selectively etched by, for example, IBE so that the second portion of the top surface 15T of the main pole 15 is exposed. Then, the coupling portion 41 is formed on the main pole 15 and the coupling portion 42 is formed on the trailing shield 16A by, for example, frame plating. Next, the insulating film 63 is formed over the entire top surface of the stack.

The insulating film 63 is then selectively etched to form therein an opening for exposing the top surface of the second connection layer. Next, the upper coil portion 20 is formed by frame plating, for example. The second nonmagnetic layer (not illustrated) is then formed over the entire top surface of the stack. The insulating film 63 and the second nonmagnetic layer are then polished by, for example, CMP, until the upper coil portion 20 and the coupling portions 41 and 42 are exposed.

Next, the insulating layer 64 is formed over the entire top surface of the stack. Then, the insulating layer 64 is selectively etched to form therein an opening for exposing the top surface of the coupling portion 42, and the top surface of a portion of the insulating layer 64 covering the top surface of the coupling portion 41 is also etched. The coupling portion 43 is then formed by frame plating, for example. Next, the protective layer 70 is formed over the entire top surface of the stack. For example, the step of forming the wirings 83 and 84 is performed simultaneously with a series of steps from the step of forming the main pole 15 to the step of forming the protective layer 70.

Next, wiring and a plurality of terminals including the terminals 81 and 82 are formed on the protective layer 70, and the substrate 1 is cut near the position ABS where the medium facing surface 80 is to be formed. The cut surface is then polished into the medium facing surface 80, and further processes such as fabrication of flying rails are performed to complete the magnetic head 100.

As has been described, the manufacturing method for the magnetic head 100 according to the present embodiment includes the steps of: forming the main pole 15; forming the spin torque oscillator 60 and the buffer layer 59 after the main pole 15 is formed; and forming the trailing shield 16A after the spin torque oscillator 60 and the buffer layer 59 are formed.

The step of forming the spin torque oscillator 60 and the buffer layer 59 includes: the step of forming the initial buffer layer 59P on the main pole 15, the initial buffer layer 59P becoming the buffer layer 59 later; the step of forming the layered film 60P on the initial buffer layer 59P, the layered film 60P becoming the spin torque oscillator 60 later; the step of forming the protective layer 92 on the layered film 60P; the step of forming the mask 93; the first etching step of etching a portion of the protective layer 92 by using the mask 93; the second etching step of etching a portion of each of the layered film 60P and the initial buffer layer 59P by using the mask 93 and the protective layer 92 as an etching mask after the first etching step so that the initial buffer layer 59P becomes the buffer layer 59; and the patterning step of patterning the layered film 60P after the second etching step so that the layered film 60P becomes the spin torque oscillator 60.

According to the present embodiment, the protective layer 92 is partly etched by using the mask 93 and thereafter each of the layered film 60P and the initial buffer layer 59P is partly etched by using the mask 93 and the protective layer 92 as an etching mask. This makes it possible to prevent the contact area between the spin torque oscillator 60 and the trailing shield 16A from becoming small. Such an effect will now be described with reference to comparisons with a manufacturing method for a magnetic head of a comparative example.

Figure 22:
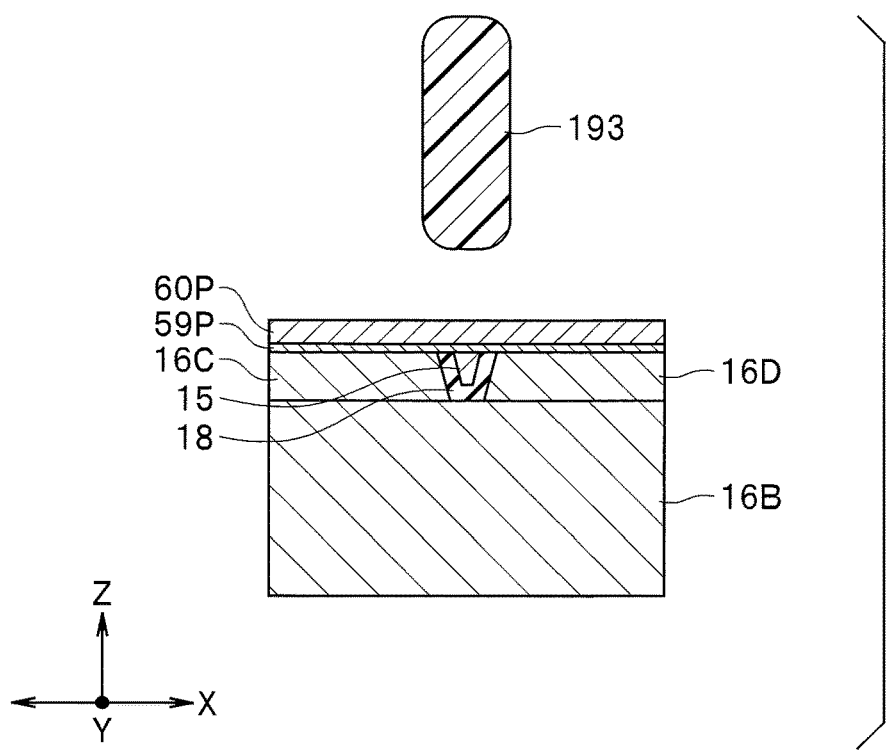
FIG. 22 is a cross-sectional view illustrating a step of a manufacturing method for a magnetic head of a comparative example.
Figure 23:
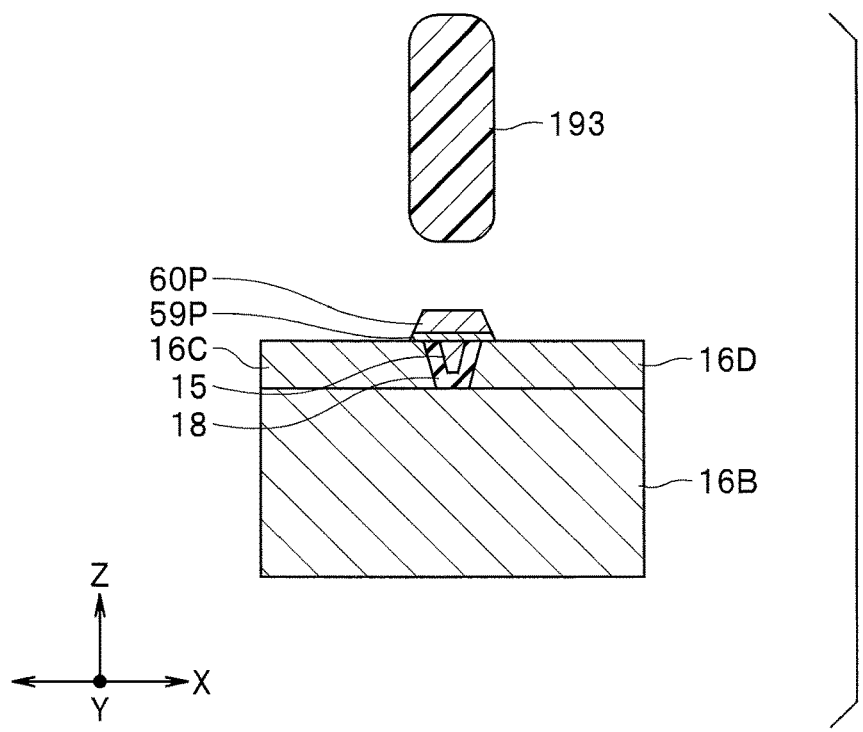
FIG. 23 is a cross-sectional view illustrating a step that follows the step illustrated in FIG. 22.
Figure 24:
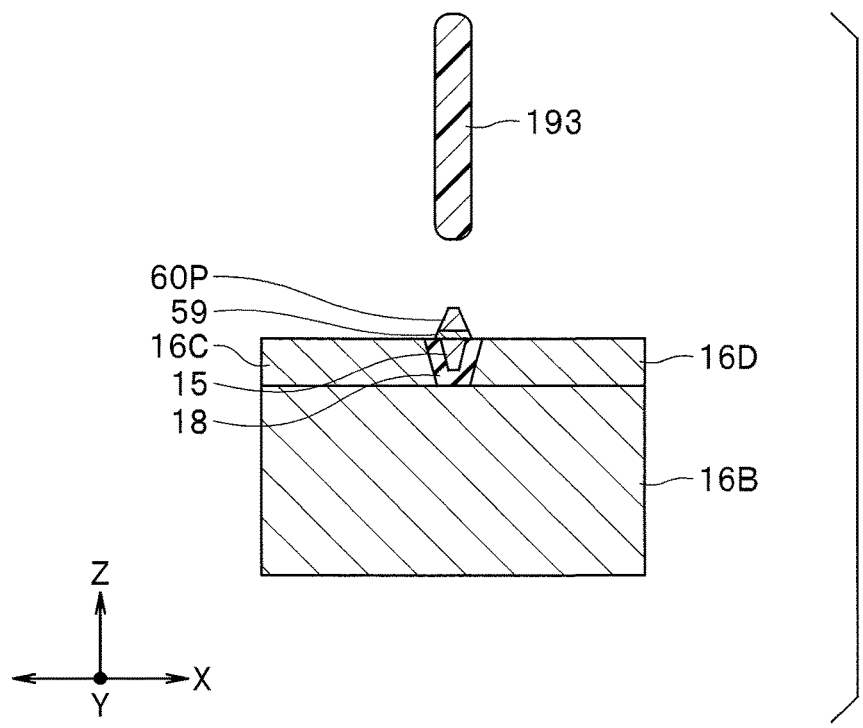
FIG. 24 is a cross-sectional view illustrating a step that follows the step illustrated in FIG. 23.

FIG. 22 to FIG. 24 illustrate a stack of layers formed in the process of manufacturing the magnetic head of the comparative example. FIG. 22 to FIG. 24 omit the illustration of portions that are closer to the substrate 1 relative to the leading shield 16B and the nonmagnetic layer 55. FIG.

22 to FIG. 24 each illustrate a cross section of the stack taken at the position where the medium facing surface 80 is to be formed.

The manufacturing method for the magnetic head of the comparative example is the same as the manufacturing method for the magnetic head 100 according to the present embodiment up to the step of forming the layered film 60P. FIG. 22 illustrates a step following the formation of the layered film 60P. In this step, a mask 193 is formed. The mask 193 is the same in configuration and shape as the mask 93 of the present embodiment. As is the case with the mask 93, a gap develops between the layered film 60P and the mask 193 in a cross section taken at the position where the medium facing surface 80 is to be formed.

FIG. 23 illustrates the next step. In this step, a portion of each of the layered film 60P and the initial buffer layer 59P is etched by using the mask 193. This etching is performed by IBE. This etching is performed with the direction of travel of ion beams set to be perpendicular or substantially perpendicular to the top surface 1a of the substrate 1.

FIG. 24 illustrates the next step. In this step, a re-deposition film deposited onto the surfaces of the layered film 60P and the initial buffer layer 59P in the etching step illustrated in FIG. 23 is removed. This step is performed in succession to the step illustrated in FIG. 23. More specifically, after the layered film 60P and the initial buffer layer 59P are etched by IBE, the direction of travel of the ion beams is inclined with respect to the direction perpendicular to the top surface 1a of the substrate 1 in order to remove the re-deposition film. The initial buffer layer 59P thereby becomes the buffer layer 59. The subsequent steps are the same as those of the manufacturing method for the magnetic head 100 according to the present embodiment.

In the manufacturing method of the comparative example, the layered film 60P is etched in the presence of the gap between the layered film 60P and the mask 193 in the cross section taken at the position where the medium facing surface 80 is to be formed. The manufacturing method of the comparative example causes the layered film 60P to be etched at and near the top surface thereof, resulting in taper-etching of the layered film 60P. Furthermore, inclining the direction of travel of ion beams in order to remove the re-deposition film causes the layered film 60P to be further etched at and near the top surface thereof. As a result, the manufacturing method of the comparative example causes the top surface 60c of the spin torque oscillator 60 to be small in width and also causes the contact area between the spin torque oscillator 60 and the trailing shield 16A to be small. A magnetic head manufactured by the manufacturing method of the comparative example thus has the problem that if a high voltage is applied to the spin torque oscillator 60, the spin torque oscillator 60 generates heat and as a result, the lifetime of the magnetic head 100 gets shorter. This problem becomes more significant as the width of the spin torque oscillator 60 decreases.

To cope with this, in the present embodiment the layered film 60P is covered with at least the protective layer 92. The present embodiment thus makes it possible that the layered film 60P is protected from being etched at and near the top surface thereof by the protective layer 92 in the process of etching the layered film 60P and in the process of removing the re-deposition film. The present embodiment thereby prevents the layered film 60P from being taper-etched. According to the present embodiment, it is thereby possible to prevent the width of the top surface 60c of the spin torque oscillator 60 from becoming smaller than the width of the bottom surface 60d of the spin torque oscillator 60, and to thereby prevent the contact area between the spin torque oscillator 60 and the trailing shield 16A from becoming small.

Furthermore, in the present embodiment, the protective layer 92 is what is called a hard mask. In the present embodiment, specifically, the protective layer 92 is formed of carbon. In the case where the protective layer 92 is formed of carbon, the etching rate of the protective layer 92 is about ¼ that of the layered film 60P, for example. According to the present embodiment, this makes it possible to more effectively prevent the layered film 60P from being taper-etched.

Further, in the present embodiment, the buffer layer 59 is interposed between the main pole 15 and the spin torque oscillator 60. In the manufacturing process of the magnetic head 100, the initial buffer layer 59P is interposed between the main pole 15 and the layered film 60P. Here, a plane that is parallel or substantially parallel to the top surface 1a of the substrate 1 is referred to as a horizontal plane, and a plane that is perpendicular or substantially perpendicular to the top surface 1a of the substrate 1 is referred to as a perpendicular plane. In general, a portion between the horizontal plane and the perpendicular plane has a tapered shape if formed by etching. Without the buffer layer 59 and the initial buffer layer 59P, any attempts to make each of the first and second side surfaces 60e and 60f, which are intended to be formed in the layered film 60P, be entirely a perpendicular plane would result in the main pole 15 being etched. As a result, it becomes difficult to obtain desired characteristics. On the other hand, any attempts to prevent the main pole 15 from being etched would result in a problem that each of the first and second side surfaces 60e and 60f to be formed in the layered film 60P is tapered in part.

In contrast, according to the present embodiment, the initial buffer layer 59P makes it possible to provide the layered film 60P with the first and second side surfaces 60e and 60f that are each entirely formed into a perpendicular plane without the occurrence of the aforementioned problem.

Modification Example

Figure 25:
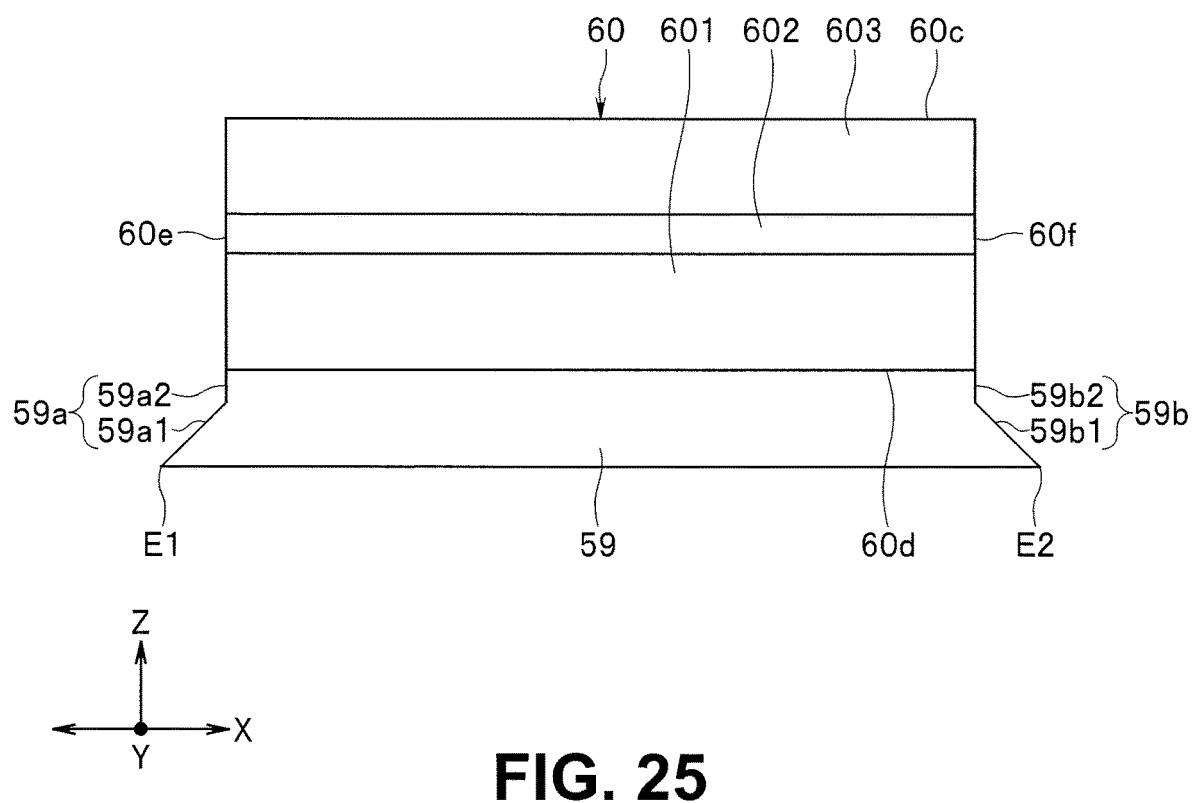
FIG. 25 is a front view illustrating a spin torque oscillator and a buffer layer in a modification example of the magnetic head according to the first embodiment of the invention.

Next, a modification example of the magnetic head 100 according to the present embodiment will be described with reference to FIG. 25. FIG. 25 is a front view illustrating the spin torque oscillator 60 and the buffer layer 59 in the modification example of the magnetic head 100. In the modification example, the third side surface 59a of the buffer layer 59 includes a first connecting portion in addition to the first inclined portion, the first connecting portion connecting the first side surface 60e of the spin torque oscillator 60 and the first inclined portion. Hereinafter, the first inclined portion will be denoted by reference symbol 59a1, and the first connecting portion by 59a2.

As mentioned previously, the first side surface 60e of the spin torque oscillator 60 forms the first angle with respect to the direction perpendicular to the top surface 1a (see FIG. 5 and FIG. 6) of the substrate 1. The first connecting portion 59a2 is contiguous with the first side surface 60e and forms an angle equal to the first angle with respect to the direction perpendicular to the top surface 1a of the substrate 1.

In the modification example, the fourth side surface 59b of the buffer layer 59 includes a second connecting portion in addition to the second inclined portion, the second connecting portion connecting the second side surface 60f of the spin torque oscillator 60 and the second inclined portion.

Hereinafter, the second inclined portion will be denoted by reference symbol 59b1, and the second connecting portion by 59b2.

As mentioned previously, the second side surface 60f of the spin torque oscillator 60 forms the second angle with respect to the direction perpendicular to the top surface 1a of the substrate 1. The second connecting portion 59b2 is contiguous with the second side surface 60f and forms an angle equal to the second angle with respect to the direction perpendicular to the top surface 1a of the substrate 1.

Second Embodiment

Figure 26:
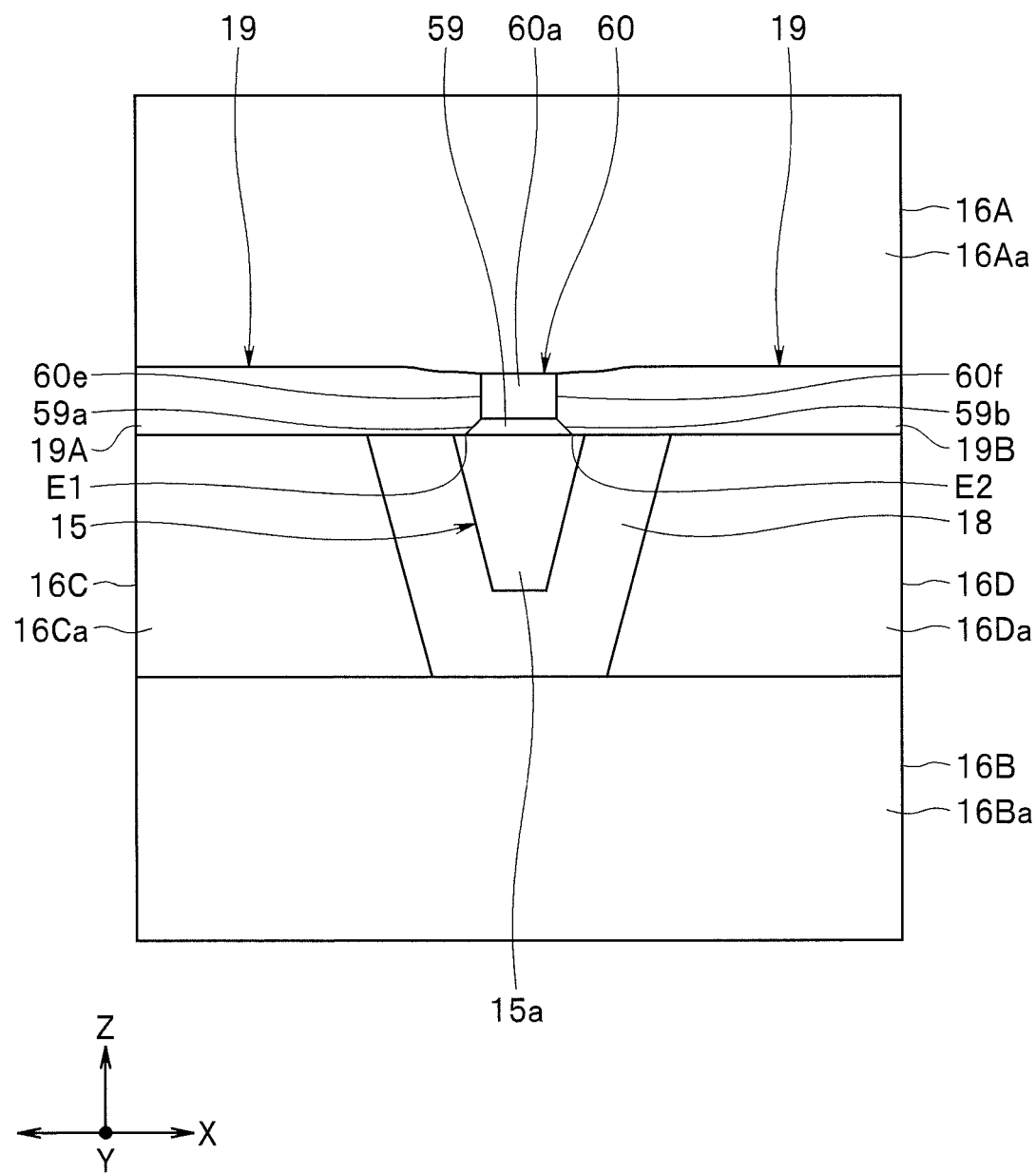
FIG. 26 is a front view illustrating essential parts of a magnetic head according to a second embodiment of the invention.

Next, a second embodiment of the invention will be described. Reference is first made to FIG. 26 to describe differences of the magnetic head 100 according to the present embodiment from that according to the first embodiment. FIG. 26 is a front view illustrating essential parts of the magnetic head 100 according to the present embodiment In the present embodiment, the spin torque oscillator 60 and the buffer layer 59 are each smaller in width in the medium facing surface 80 compared with the first embodiment. The bottom edge E1 of the third side surface 59a of the buffer layer 59 and the bottom edge E2 of the fourth side surface 59b of the buffer layer 59 are in contact with the main pole 15.

Figure 27:
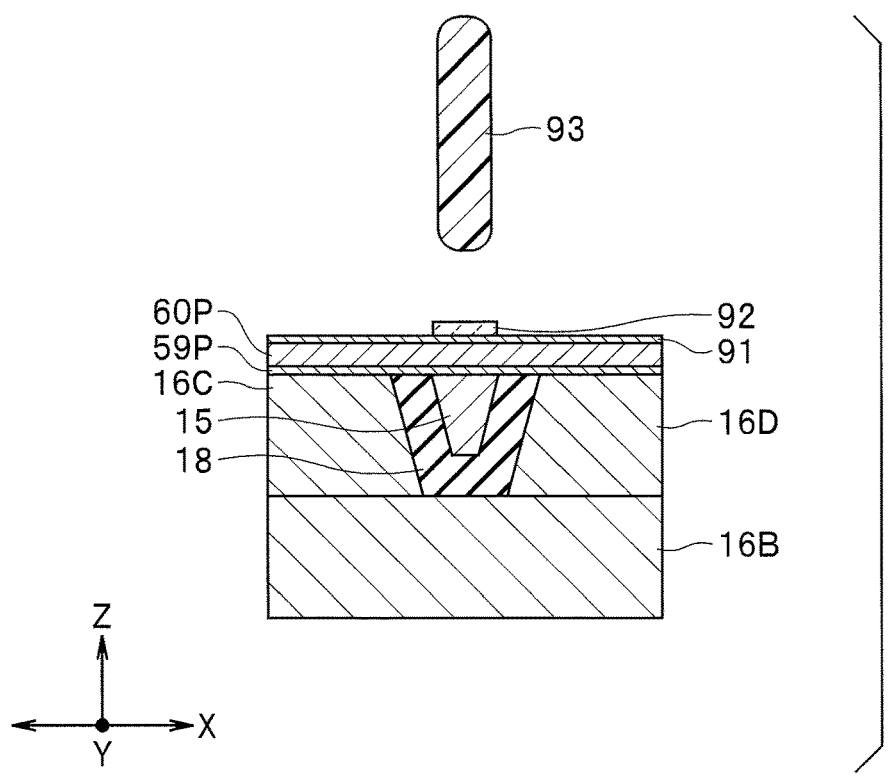
FIG. 27 is a cross-sectional view illustrating a step of a manufacturing method for the magnetic head according to the second embodiment of the invention.
Figure 28:
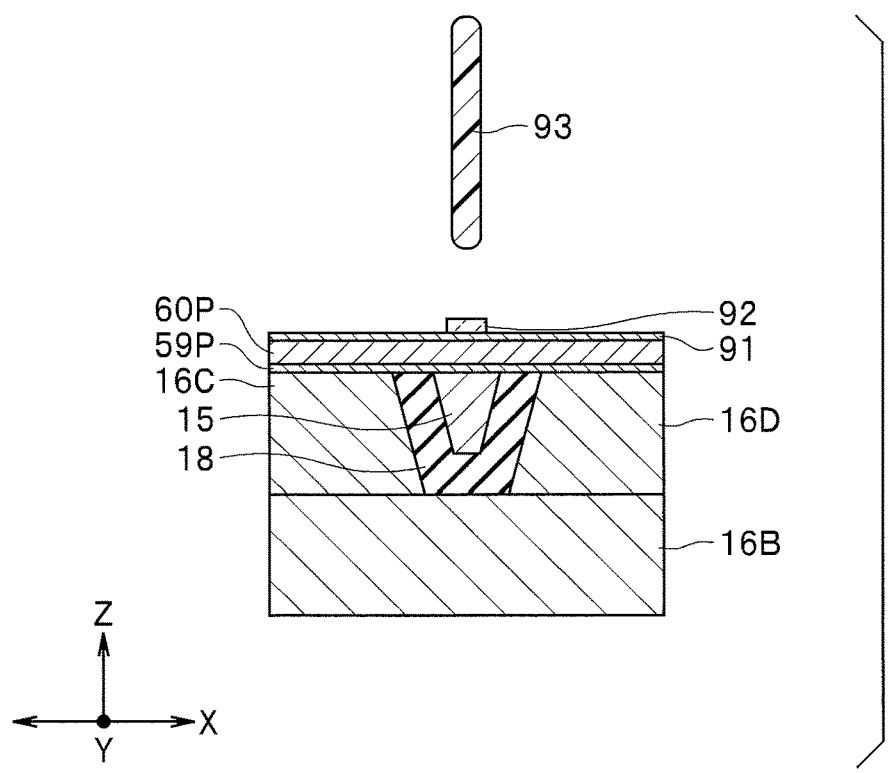
FIG. 28 is a cross-sectional view illustrating a step that follows the step illustrated in FIG. 27.
Figure 29:
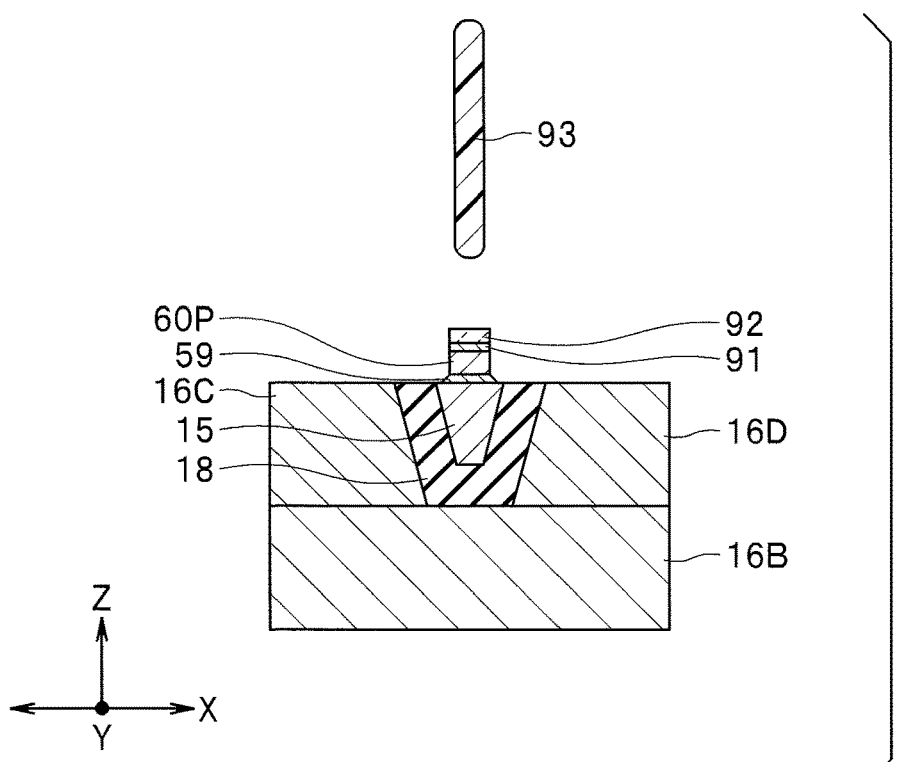
FIG. 29 is a cross-sectional view illustrating a step that follows the step illustrated in FIG. 28.

Next, a manufacturing method for the magnetic head 100 according to the present embodiment will be described with reference to FIG. 27 to FIG. 29. FIG. 27 to FIG. 29 each illustrate a stack of layers formed in the process of manufacturing the magnetic head 100 according to the present embodiment. FIG. 27 to FIG. 29 omit the illustration of portions that are closer to the substrate 1 (see FIG. 5 and FIG. 6) relative to the leading shield 16B. FIG. 27 to FIG. 29 each illustrate a cross section of the stack taken at the position where the medium facing surface 80 is to be formed.

The manufacturing method for the magnetic head 100 according to the present embodiment is the same as the method according to the first embodiment up to the step of forming the mask 93. FIG. 27 illustrates a step following the formation of the mask 93. In this step, a first etching step of etching a portion of the protective layer 92 is performed by using the mask 93. The first etching step employs RIE. In the case where the protective layer 92 is of carbon, a gas containing $O_2$ is used as an etching gas.

FIG. 28 illustrates the next step. In this step, the mask 93 is made smaller in width in the cross section taken at the position where the medium facing surface 80 is to be formed, and also the protective layer 92 is made smaller in width in the cross section taken at the position where the medium facing surface 80 is to be formed. This step is performed in succession to the step illustrated in FIG. 27. In particular, if the first etching step is performed by RIE using a gas containing $O_2$, it is possible to reduce the width of the mask 93 by over-etching. After this step, the width of the mask 93 in the cross section taken at the position where the medium facing surface 80 is to be formed falls within the range of 15 to 25 nm, for example.

FIG. 29 illustrates the next step. In this step, a second etching step of etching a portion of each of the layered film 60P and the initial buffer layer 59P is performed using the mask 93 and the protective layer 92 as an etching mask. The second etching step in the present embodiment removes a portion of the layered film 60P not covered with the mask 93 or the protective layer 92. Further, the second etching step in the present embodiment removes a portion of the initial buffer layer 59P not covered with the mask 93, the protective layer 92 or the layered film 60P. The subsequent steps are the same as those in the first embodiment.

In the present embodiment, after the first etching step and before the second etching step the mask 93 is made smaller in width in the cross section taken at the position where the medium facing surface 80 is to be formed. The present embodiment thereby enables reduction in width of the spin torque oscillator 60 in the medium facing surface 80.

Furthermore, according to the present embodiment, the protective layer 92 prevents the layered film 60P from being taper-etched, as in the first embodiment. The present embodiment thus makes it possible for the spin torque oscillator 60 to have a small width in the medium facing surface 80 while preventing the top surface 60c of the spin torque oscillator 60 from becoming smaller in width than the bottom surface 60d of the spin torque oscillator 60.

The other configuration, function and effects of the present embodiment are similar to those of the first embodiment.

Third Embodiment

Figure 30:
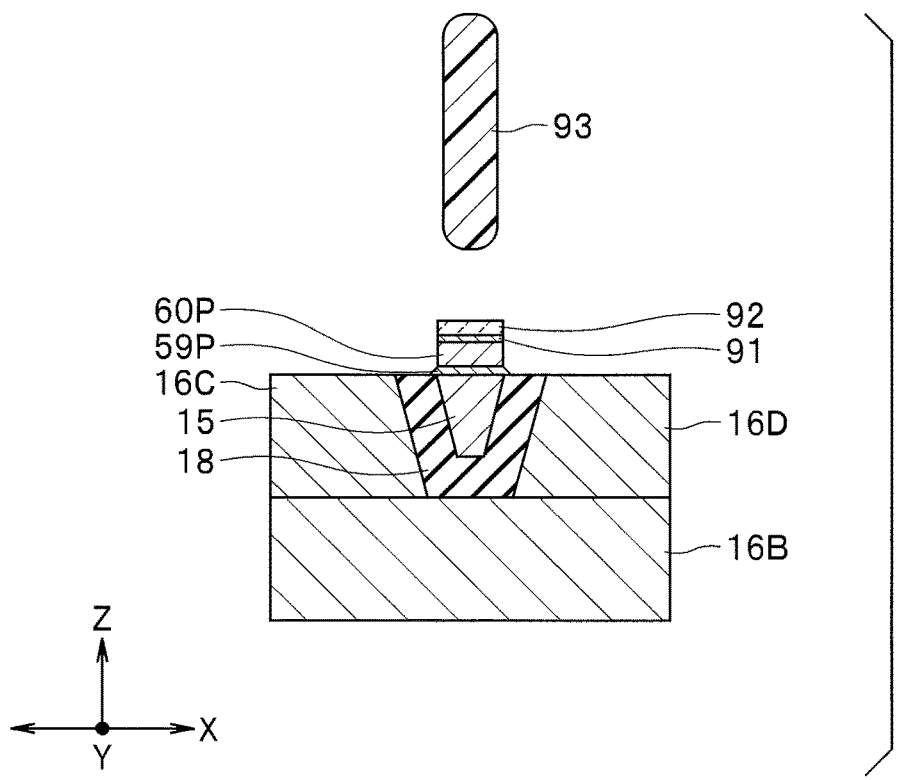
FIG. 30 is a cross-sectional view illustrating a step of a manufacturing method for a magnetic head according to a third embodiment of the invention.
Figure 31:
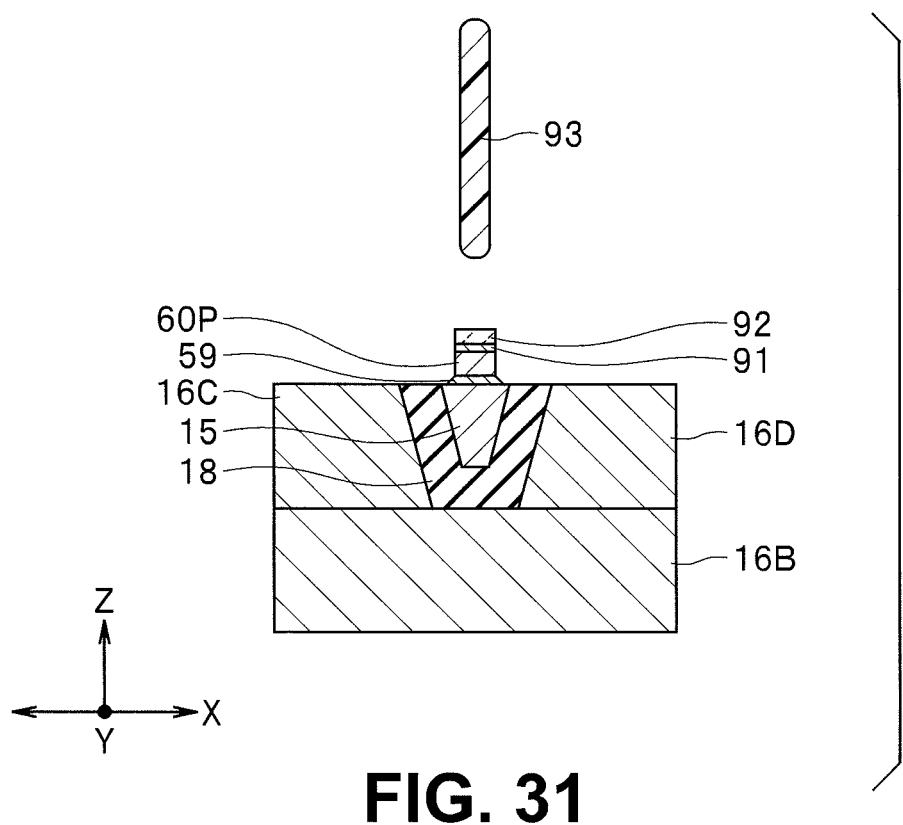
FIG. 31 is a cross-sectional view illustrating a step that follows the step illustrated in FIG. 30.

Next, reference is made to FIG. 30 and FIG. 31 to describe a manufacturing method for a magnetic head 100 according to a third embodiment. FIG. 30 and FIG. 31 illustrates a stack of layers formed in the process of manufacturing the magnetic head 100 according to the present embodiment. FIG. 30 and FIG. 31 omits the illustration of portions that are closer to the substrate 1 (see FIG. 5 and FIG. 6) relative to the leading shield 16B. FIG. 30 and FIG. 31 illustrates a cross section of the stack taken at the position where the medium facing surface 80 is to be formed.

The manufacturing method for the magnetic head 100 according to the present embodiment is the same as the method according to the second embodiment up to the first etching step. In the present embodiment, a second etching step is performed after the first etching step. FIG. 30 and FIG. 31 illustrate the second etching step. The step illustrated in FIG. 30 is a step following the first etching step. In this step, a portion of each of the layered film 60P and the initial buffer layer 59P is etched by IBE using the mask 93 and the protective layer 92 as an etching mask.

FIG. 31 illustrates the next step. In this step, the layered film 60P is made smaller in width in a cross section taken at the position where the medium facing surface 80 is to be formed. This step is performed in succession to the step illustrated in FIG. 30. Specifically, after the layered film 60P is etched by IBE, the direction of travel of the ion beams is inclined with respect to the direction perpendicular to the top surface 1a of the substrate 1. This provides the layered film 60P with the first and second side surfaces 60e and 60f of the spin torque oscillator 60, and provides the initial buffer layer 59P with the third and fourth side surfaces 59a and 59b of the buffer layer 59. Providing the initial buffer layer 59P with the third and fourth side surfaces 59a and 59b makes the initial buffer layer 59P into the buffer layer 59. The subsequent steps are the same as those in the second embodiment.

The other configuration, function and effects of the present embodiment are similar to those of the second embodiment.

[Manufacturing Method for MR Element]

A series of steps for forming the spin torque oscillator 60 and the buffer layer 59, which has been described in relation to the foregoing embodiments, is also applicable to the MR element 5. Thus, an example in which the series of steps for forming the spin torque oscillator 60 and the buffer layer 59 is applied to the MR element 5 will be described below.

Figure 32:
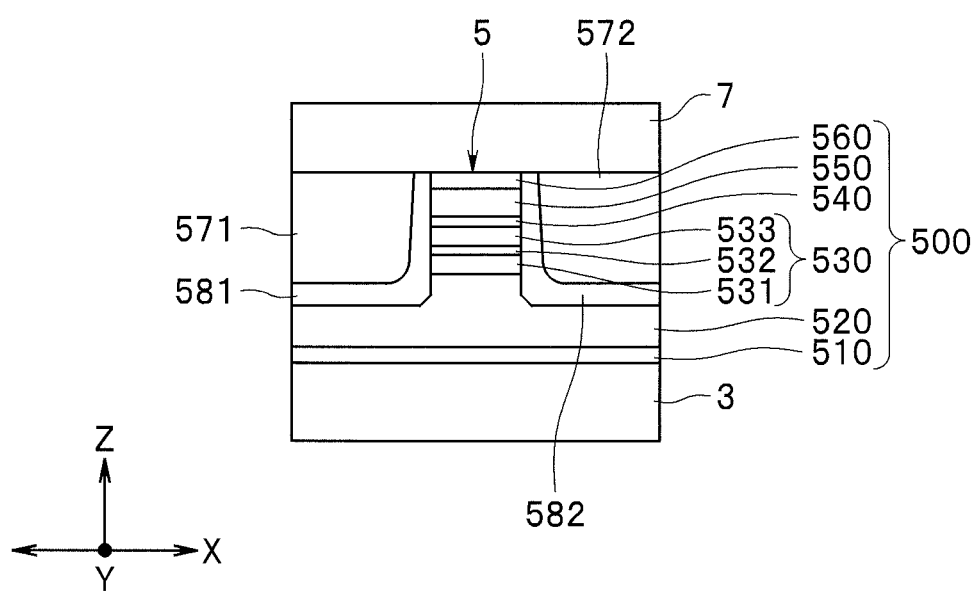
FIG. 32 is a front view illustrating an example of a configuration of a magnetoresistive element.

To begin with, a configuration of the MR element 5 will be described with reference to FIG. 32. FIG. 32 is a front view illustrating an example configuration of the MR element 5. The MR element 5 illustrated in FIG. 32 is a TMR element or a CPP-type GMR element.

As has been described in relation to the first embodiment, the MR element 5 is disposed between the first read shield layer 3 and the second read shield layer 7. The MR element 5 includes an MR stack 500. The MR stack 500 includes an underlayer 510, a magnetic layer 520, a pinned layer 530, a spacer layer 540, a free layer 550, and a cap layer 560 stacked in this order over the first read shield layer 3. The underlayer 510 and the cap layer 560 are each formed of a nonmagnetic conductive material such as Ru or Ta. The magnetic layer 520 is formed of a magnetic material such as NiFe.

The pinned layer 530 has a magnetization whose direction is fixed. In the example illustrated in FIG. 32, the pinned layer 530 has what is called a synthetic structure, including a first magnetic layer 531, a second magnetic layer 533, and a nonmagnetic layer 532 disposed between the first magnetic layer 531 and the second magnetic layer 533. The free layer 550 is a ferromagnetic layer whose magnetization direction varies depending on a signal magnetic field. The spacer layer 540 is a tunnel barrier layer in a TMR element, and a nonmagnetic conductive layer in a GMR element.

The MR element 5 further includes a pair of shield layers 571 and 572 disposed on opposite sides of the MR stack 500 in the track width direction (the X direction), an insulating layer 581 interposed between the MR stack 500 and each of the first read shield layer 3 and the shield layer 571, and an insulating layer 582 interposed between the MR stack 500 and each of the first read shield layer 3 and the shield layer 572. The shield layers 571 and 572 are formed of a magnetic material such as NiFe. The insulating layers 581 and 582 are formed of an insulating material such as MgO.

Next, a manufacturing method for the MR element 5 will be described with reference to FIG. 33 to FIG. 39. FIG. 33 to FIG. 39 each illustrate a stack of layers formed in the process of manufacturing the MR element 5. FIG. 33 to FIG. 39 omit the illustration of portions that are closer to the substrate 1 (see FIG. 5 and FIG. 6) relative to the first read shield layer 3. FIG. 33 to FIG. 39 each illustrate a cross section of the stack taken at the position where the medium facing surface 80 is to be formed.

Figure 33:
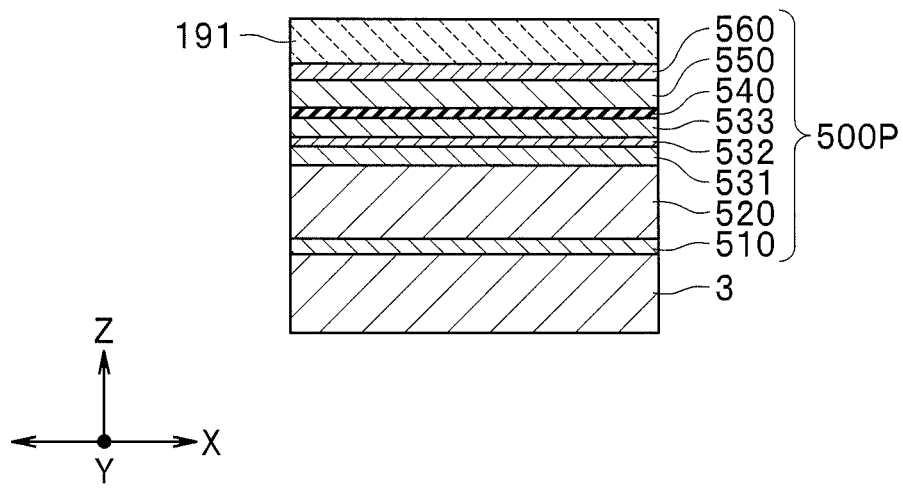
FIG. 33 is a cross-sectional view illustrating a step of a manufacturing method for the magnetoresistive element illustrated in FIG. 32.

As illustrated in FIG. 33, the manufacturing method for the MR element 5 starts with forming a layered film 500P, which becomes the MR stack 500 later, on the first read shield layer 3. The layered film 500P includes the underlayer 510, the magnetic layer 520, the first magnetic layer 531, the nonmagnetic layer 532, the second magnetic layer 533, the spacer layer 540, the free layer 550, and the cap layer 560 stacked in this order over the first read shield layer 3. Next, a protective layer 191 is formed on the layered film 500P. The protective layer 191 is what is called a hard mask, and is formed of an inorganic material. An example of the inorganic material used to form the protective layer 191 is carbon. Note that diamond-like carbon may be used as the carbon. In the case of using diamond-like carbon as the material of the protective layer 191, the protective layer 191 is formed by chemical vapor deposition, for example.

Figure 34:
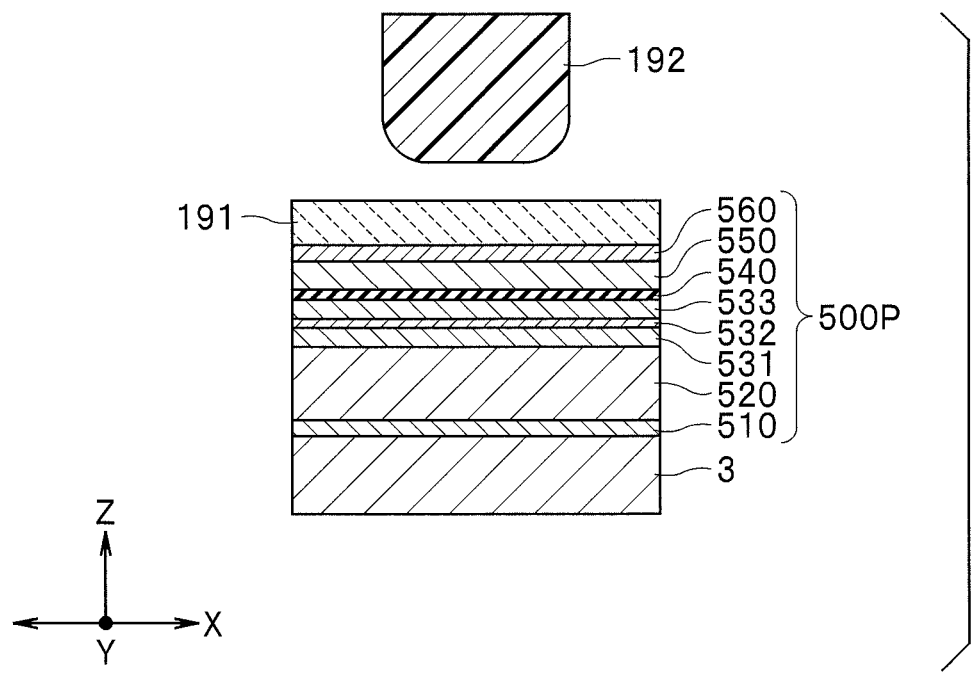
FIG. 34 is a cross-sectional view illustrating a step that follows the step illustrated in FIG. 33.

FIG. 34 illustrates the next step. In this step, a mask 192 is formed on the protective layer 191. The mask 192 includes a lower layer lying on the protective layer 191 and an upper layer lying on the lower layer. The upper layer is formed of a photoresist patterned by photolithography. The lower layer is formed of, for example, a material that dissolves in a developing solution used in patterning the upper layer.

When the upper layer is patterned, a portion of the lower layer interposed between the protective layer 191 and the upper layer in and near the cross section taken at the position where the medium facing surface 80 is to be formed is removed. As a result, as illustrated in FIG. 34, a gap develops between the protective layer 191 and the mask 192 in the cross section taken at the position where the medium facing surface 80 is to be formed. Note that even if the foregoing portion of the lower layer is removed, the mask 192 will not peel away since the lower layer remains between the protective layer 191 and the upper layer except in and near the cross section taken at the position where the medium facing surface 80 is to be formed.

Figure 35:
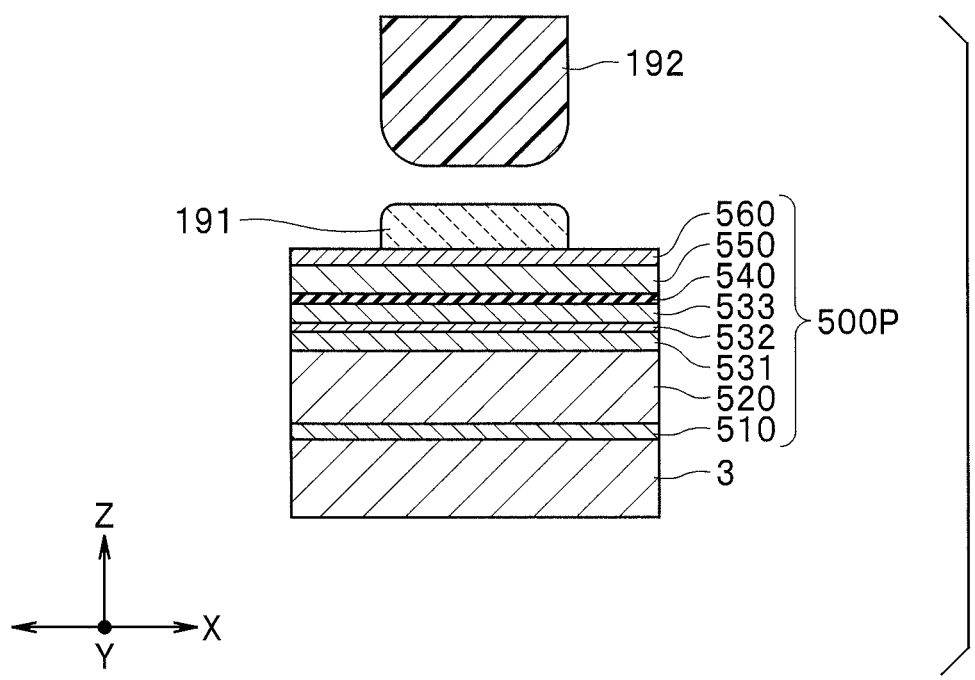
FIG. 35 is a cross-sectional view illustrating a step that follows the step illustrated in FIG. 34.

FIG. 35 illustrates the next step. In this step, a portion of the protective layer 191 is etched by, for example, RIE, using the mask 192. In the case where the protective layer 191 is of carbon, a gas containing $O_2$ is used as an etching gas.

Figure 36:
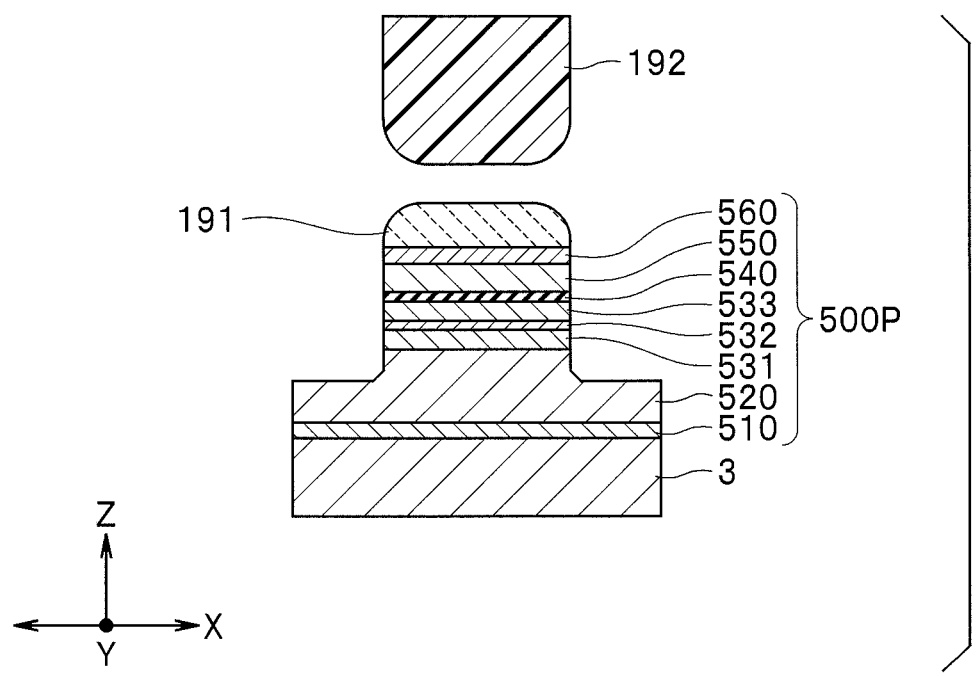
FIG. 36 is a cross-sectional view illustrating a step that follows the step illustrated in FIG. 35.
Figure 37:
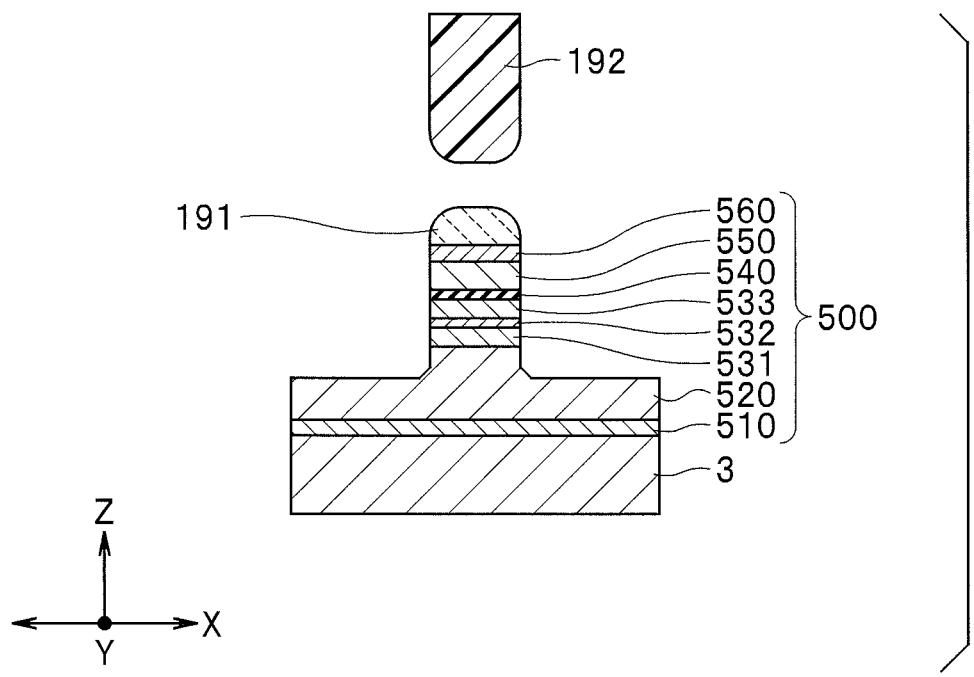
FIG. 37 is a cross-sectional view illustrating a step that follows the step illustrated in FIG. 36.

FIG. 36 illustrates the next step. In this step, a portion of the layered film 500P is etched by IBE using the mask 192 and the protective layer 191 as an etching mask. This etching etches all the layers constituting the layered film 500P except the underlayer 510. Hereinafter, a portion of the layered film 500P whose width has been made smaller by etching in the step illustrated in FIG. 36 will be referred to as an etched portion. The etched portion includes the first magnetic layer 531, the nonmagnetic layer 532, the second magnetic layer 533, the spacer layer 540, the free layer 550 and the cap layer 560, and also a portion of the magnetic layer 520 that has been etched.

FIG. 36 illustrates the next step. In this step, the etched portion of the layered film 500P is made smaller in width in the cross section taken at the position where the medium facing surface 80 is to be formed. This step is performed in succession to the step illustrated in FIG. 35. Specifically, after the layered film 500P is etched by IBE, the direction of travel of the ion beams is inclined with respect to the direction perpendicular to the top surface 1a of the substrate 1.

Figure 38:
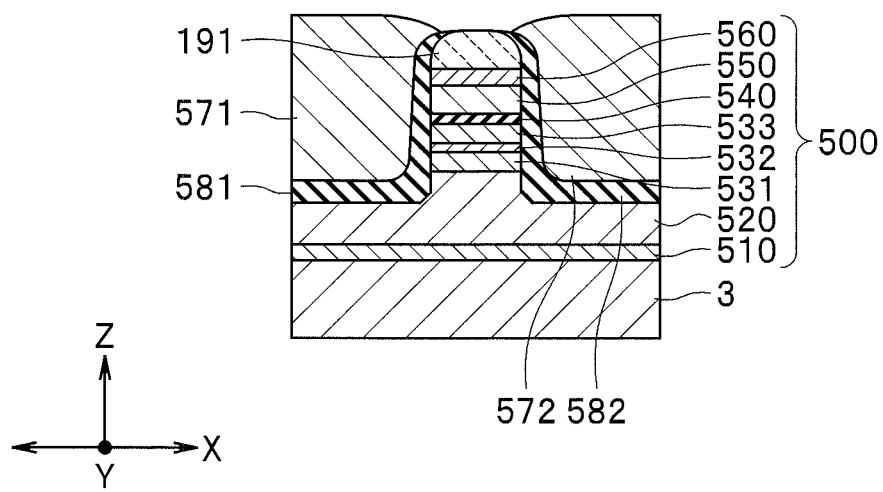
FIG. 38 is a cross-sectional view illustrating a step that follows the step illustrated in FIG. 37.

FIG. 38 illustrates the next step. In this step, first, the insulating layers 581 and 582 are formed with the mask 192 left intact. Next, the shield layers 571 and 572 are formed with the mask 192 left intact. The mask 192 is then lifted off.

Figure 39:
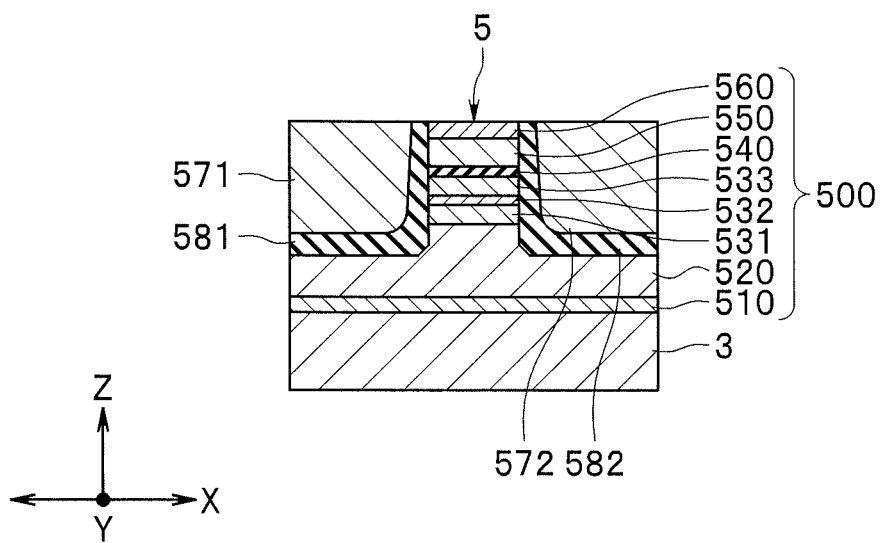
FIG. 39 is a cross-sectional view illustrating a step that follows the step illustrated in FIG. 38.

FIG. 39 illustrates the next step. In this step, first, the protective layer 191 is removed. In the case where the protective layer 191 is of carbon, the protective layer 191 is removed by ashing, for example. Next, a portion of each of the insulating layers 581 and 582 is etched by, for example, wet etching. The top surfaces of the shield layers 571 and 572 are then etched by, for example, IBE. Next, a portion of the layered film 500P away from the position where the medium facing surface 80 is to be formed is etched so as to make the layered film 500P into the MR stack 500. The layered film 500P thus becomes the MR stack 500. Next, the insulating layer 6 (see FIG. 5) is formed over the entire top surface of the stack. The insulating layer 6 is then polished by, for example, CMP, until the MR stack 500 is exposed. The MR element 5 is thereby completed.

As described above, if the series of steps for forming the spin torque oscillator 60 and the buffer layer 59 is applied to the MR element 5, the protective layer 191 prevents the etched portion of the layered film 500P from being taper-etched as is the case with the spin torque oscillator 60. This consequently makes it possible to prevent the side surfaces of the MR stack 500 formed by etching from becoming inclined in part.

The present invention is not limited to the foregoing embodiments, and various modifications may be made thereto. As long as the requirements of the appended claims are met, the shape and position of each of the spin torque oscillator 60 and the buffer layer 59 are not limited to the examples illustrated in the foregoing embodiments but can be freely chosen. For example, the front end face 60*a* of the spin torque oscillator 60 may be located away from the medium facing surface 80.

Further, in the first embodiment, the inorganic material layer 94 is not an essential component in the manufacturing method for the magnetic head 100, and may thus be dispensed with.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head comprising:
   a medium facing surface configured to face a recording medium;
   a main pole configured to generate a write magnetic field for writing data on the recording medium;
   a trailing shield formed of a magnetic material and located forward relative to the main pole in a direction of travel of the recording medium;
   a spin torque oscillator disposed between the main pole and the trailing shield and electrically connected to the main pole and the trailing shield;
   a buffer layer formed of a nonmagnetic conductive material and interposed between the main pole and the spin torque oscillator; and
   a substrate having a top surface, wherein
   the main pole, the trailing shield, the spin torque oscillator, and the buffer layer are disposed above the top surface of the substrate,
   the spin torque oscillator has a first side surface and a second side surface opposite to each other in a track width direction,
   the first side surface and the second side surface respectively form a first angle and a second angle with respect to a direction perpendicular to the top surface of the substrate,
   the first angle and the second angle each fall within a range of 0° to 10°,
   the buffer layer has a third side surface and a fourth side surface opposite to each other in the track width direction,
   the third side surface is contiguous with the first side surface,
   the third side surface includes a first inclined portion inclined with respect to the direction perpendicular to the top surface of the substrate,
   the first inclined portion forms a third angle greater than the first angle with respect to the direction perpendicular to the top surface of the substrate,
   the fourth side surface is contiguous with the second side surface,
   the fourth side surface includes a second inclined portion inclined with respect to the direction perpendicular to the top surface of the substrate, and
   the second inclined portion forms a fourth angle greater than the second angle with respect to the direction perpendicular to the top surface of the substrate.

2. The magnetic head according to claim 1, wherein
   the third side surface further includes a first connecting portion connecting the first side surface and the first inclined portion,
   the first connecting portion forms an angle equal to the first angle with respect to the direction perpendicular to the top surface of the substrate,
   the fourth side surface further includes a second connecting portion connecting the second side surface and the second inclined portion, and
   the second connecting portion forms an angle equal to the second angle with respect to the direction perpendicular to the top surface of the substrate.

3. The magnetic head according to claim 1, further comprising:
   first and second side shields formed of a magnetic material and located on opposite sides of the main pole in the track width direction; and
   a gap layer formed of a nonmagnetic material and interposed between the main pole and the first and second side shields, wherein
   each of the third and fourth side surfaces has a bottom edge closest to the top surface of the substrate, and
   the bottom edge of each of the third and fourth side surfaces is in contact with the gap layer.

4. The magnetic head according to claim 1, wherein
   each of the third and fourth side surfaces has a bottom edge closest to the top surface of the substrate, and
   the bottom edge of each of the third and fourth side surfaces is in contact with the main pole.

5. A manufacturing method for the magnetic head of claim 1, comprising;
   a step of forming the main pole;
   a step of forming the spin torque oscillator and the buffer layer after the main pole is formed; and
   a step of forming the trailing shield after the spin torque oscillator and the buffer layer are formed,
   wherein the step of forming the spin torque oscillator and the buffer layer includes:
   a step of forming an initial buffer layer on the main pole, the initial buffer layer becoming the buffer layer later;
   a step of forming a layered film on the initial buffer layer, the layered film becoming the spin torque oscillator later;
   a step of forming a protective layer on the layered film;
   a step of forming a mask;
   a first etching step of etching a portion of the protective layer by using the mask;
   a second etching step of etching a portion of each of the layered film and the initial buffer layer by using the mask and the protective layer as an etching mask after the first etching step so that the initial buffer layer becomes the buffer layer; and
   a patterning step of patterning the layered film after the second etching step so that the layered film becomes the spin torque oscillator.

6. The manufacturing method for the magnetic head according to claim 5, wherein
   the spin torque oscillator further has a rear end face farthest from the medium facing surface,
   the mask has a first sidewall that defines a shape and a position of each of the first and third side surfaces, and a second sidewall that defines a shape and a position of each of the second and fourth side surfaces, the second etching step is a step of etching the layered film and the initial buffer layer so as to provide the layered film with the first and second side surfaces and provide the initial buffer layer with the third and fourth side surfaces, and the patterning step is a step of etching the layered film so as to provide the layered film with the rear end face.

7. The manufacturing method for the magnetic head according to claim 5, wherein the protective layer is formed of carbon.

8. The manufacturing method for the magnetic head according to claim 5, wherein the mask is formed of a photoresist.

9. The manufacturing method for the magnetic head according to claim 8, wherein the mask is located at a distance from the protective layer in a cross section taken at a position where the medium facing surface is to be formed.

* * * * *